United States Patent [19]
Murthy et al.

[11] Patent Number: 5,515,376
[45] Date of Patent: May 7, 1996

[54] COMMUNICATION APPARATUS AND METHODS

[75] Inventors: Manohar Murthy, Milpitas; John F. Wakerly; Arthur I. Laursen, both of Mountain View, all of Calif.

[73] Assignee: Alantec, Inc., San Jose, Calif.

[21] Appl. No.: 93,397

[22] Filed: Jul. 19, 1993

[51] Int. Cl.⁶ .......................... H04L 12/46; H04L 12/26
[52] U.S. Cl. ........................ 370/85.13; 370/17; 370/94.1
[58] Field of Search .................................. 370/85.13, 60, 370/58.2, 85.9, 85.1, 95.2, 13, 17, 94.3, 94.1, 85.14, 14; 340/825.06, 825.07

[56] References Cited

U.S. PATENT DOCUMENTS

| | | | |
|---|---|---|---|
| 3,938,144 | 2/1976 | Pederson et al. | 370/13 |
| 4,817,080 | 3/1989 | Soha | 370/17 |
| 4,920,529 | 4/1990 | Sasaki et al. | 370/17 |
| 5,151,897 | 9/1992 | Suzuki | 370/85.13 |
| 5,274,631 | 12/1993 | Bhardwaj | 370/85.13 |

*Primary Examiner*—Douglas W. Olms
*Assistant Examiner*—Huy D. Vu
*Attorney, Agent, or Firm*—Skjerven, Morrill, MacPherson, Franklin & Friel; Michael Shenker

[57] ABSTRACT

A multi-port packet-based bridge is described in which packet transmissions on particular ports or between ports may be monitored on another, monitoring port. Efficient operation is realized by using a multi-processor environment and data structures that allow a packet received on one port to be transmitted to multiple ports without being "copied" multiple times. By using a Supervisory Access Terminal, it is possible to specify various circumstances under which a packet will be sent to the monitoring port. These circumstances include monitoring of all packets incoming to a selected port (or ports), all packets forwarded to a selected port (or ports), and packets generated internally and sent to a selected port (or ports). In addition, all packets forwarded from one selected port to another selected port may be monitored. Port monitoring is supported by particular data structures that promote efficient dispatching of packets and by a Bridging Cache that retains the results of recent dispatch calculations. Similar techniques are applied to multi-port routers.

33 Claims, 22 Drawing Sheets

| Station Address | Port Number |
|---|---|
| A0 | 0 |
| B0 | 0 |
| C0 | 0 |
| A1 | 1 |
| B1 | 1 |
| C1 | 1 |
| A2 | 2 |
| B2 | 2 |
| C2 | 2 |
| A3 | 3 |
| B3 | 3 |
| C3 | 3 |
| A5 | 5 |
| B5 | 5 |
| C5 | 5 |

Figure 4

|   | 0 | 1 | 2 | 3 | 4 | 5 |
|---|---|---|---|---|---|---|
| 0 | 000000 | 000010 | 000100 | 001000 | 000000 | 100000 |
| 1 | 000001 | 000000 | 000100 | 001000 | 000000 | 100000 |
| 2 | 000001 | 000010 | 000000 | 001000 | 000000 | 100000 |
| 3 | 000001 | 000010 | 000100 | 000000 | 000000 | 100000 |
| 4 | 000000 | 000000 | 000000 | 000000 | 000000 | 000000 |
| 5 | 000001 | 000010 | 000100 | 001000 | 000000 | 000000 |

Figure 12

| | | |
|---|---|---|
| R P O R T | 0 | 101110 |
| | 1 | 101101 |
| | 2 | 101011 |
| | 3 | 100111 |
| | 4 | 000000 |
| | 5 | 001111 |

Figure 13

| MPORT | | |
|---|---|---|
| | 0 | 000001 |
| | 1 | 000010 |
| | 2 | 000100 |
| | 3 | 001000 |
| | 4 | 000000 |
| | 5 | 100000 |

Figure 14

|  | | XPORT (86) | | | | | |
|---|---|---|---|---|---|---|---|
|  | | 0 | 1 | 2 | 3 | 4 | 5 |
| R P O R T | 0 | 000000 | 000010 | 000100 | 001000 | 000000 | 100000 |
|  | 1 | 000001 | 000000 | 000100 | 001000 | 000000 | 100000 |
|  | 2 | 010001 | 010010 | 010000 | 011000 | 010000 | 110000 |
|  | 3 | 000001 | 000010 | 000100 | 000000 | 000000 | 100000 |
|  | 4 | 000000 | 000000 | 000000 | 000000 | 000000 | 000000 |
|  | 5 | 000001 | 000010 | 000100 | 001000 | 000000 | 000000 |

Figure 17A

| R P O R T | 0 | 101110 |
|---|---|---|
|  | 1 | 101101 |
|  | 2 | 111011 |
|  | 3 | 100111 |
|  | 4 | 000000 |
|  | 5 | 001111 |

Figure 17B

|  | | \multicolumn{6}{c}{XPORT} |
|---|---|---|---|---|---|---|---|
|  | | 0 | 1 | 2 | 3 | 4 | 5 |
| R P O R T | 0 | 000000 | 000010 | 010100 | 001000 | 000000 | 100000 |
|  | 1 | 000001 | 000000 | 010100 | 001000 | 000000 | 100000 |
|  | 2 | 000001 | 000010 | 000000 | 001000 | 000000 | 100000 |
|  | 3 | 000001 | 000010 | 010100 | 000000 | 000000 | 100000 |
|  | 4 | 000000 | 000000 | 010000 | 000000 | 000000 | 000000 |
|  | 5 | 000001 | 000010 | 010100 | 001000 | 000000 | 100000 |

Figure 18A

| R P O R T | 0 | 111110 |
|---|---|---|
|  | 1 | 111101 |
|  | 2 | 101011 |
|  | 3 | 110111 |
|  | 4 | 000000 |
|  | 5 | 011111 |

Figure 18B

| | | \- XPORT 86 | | | | | |
|---|---|---|---|---|---|---|---|
| | | 0 | 1 | 2 | 3 | 4 | 5 |
| R P O R T | 0 | 000000 | 000010 | 000100 | 001000 | 000000 | 100000 |
| | 1 | 000001 | 000000 | 000100 | 001000 | 000000 | 100000 |
| | 2 | 000001 | 000010 | 000000 | 011000 | 000000 | 100000 |
| | 3 | 000001 | 000010 | 000100 | 000000 | 000000 | 100000 |
| | 4 | 000000 | 000000 | 000000 | 000000 | 000000 | 000000 |
| | 5 | 000001 | 000010 | 000100 | 001000 | 000000 | 000000 |

Figure 20A

| | | |
|---|---|---|
| R P O R T | 0 | 101110 |
| | 1 | 101101 |
| | 2 | 111011 |
| | 3 | 100111 |
| | 4 | 000000 |
| | 5 | 011111 |

Figure 20B

COMMUNICATION APPARATUS AND METHODS

FIELD OF INVENTION

This invention relates to packet oriented multi-port bridges and routers and, in particular, to the monitoring of packet traffic arriving at the bridges and routers or generated internally.

DESCRIPTION OF RELATED ART

Multi-port bridges and routers allow the connection of two or more packet-based networks of possibly different types. Information in such networks is transmitted by means of packets, each containing data and appropriate addressing information. The purpose of the bridge or router is to relay packets between network segments (a process called forwarding) so that stations connected to different network segments may communicate. An example of a packet-based network protocol is that implemented by the IEEE 802.3 Ethernet standard.

Larger networks can be built by using multiple bridges, routers, or combinations thereof, and the extent and topology of a multi-bridge or multi-router network can be quite complex. Even small single-bridge networks can exhibit complex behavior which may affect performance, security or other aspects of network operations. Analysis of such issues and their correction is usually the responsibility of a network manager, who must examine transmissions on the network and make adjustments to network parameters.

Monitoring of packet networks can be carried out with monitoring devices such as Sniffer™ from Network General of Menlo Park, Calif. or LANalyzer™ from Novell, Inc. of Provo, UT. These devices are connected to the network medium, such as coaxial cable, and examine each network transmission regardless of the actual destination of the packets. Typically, network monitors provide the capability of filtering the examined transmission so that only packets with properties of interest to the network manager are captured or displayed. Facilities are usually provided to gather statistics, such as error rates, traffic between stations or groups of stations and so forth, as well as the packets themselves. Because of the need to capture and analyze large amounts of data, and the potential complexity of filtering, network monitors are expensive relative to other network components such as stations or bridges.

A serious limitation of prior-art network monitors is that the monitor must be connected physically to the network segment to be monitored. In a multi-port bridge where several network segments are connected by a bridge, it is only possible to examine one of the attached network segments at a time since the bridge isolates the physical media of the network segments. A further limitation is that the network monitor is not able to easily differentiate packets originating on the attached network segment and those originating on other network segments attached to the bridge and forwarded to the monitored network segment, especially if the packets have wrong addresses due to malfunction or sabotage. A router, moreover, replaces the source address of the packet by the router address, which makes it even more difficult for the network monitor to determine where the packet originated. In particular, it may be difficult or impossible for the monitor to isolate, for example, all the packets originating on a selected network segment.

One prior art approach to overcoming the limitation of connecting the monitor to only one network segment is the Distributed Sniffer™ from Network General. Each Sniffer is a network monitor coupled to a processing element that can be controlled over the network. If several network segments attached to a bridge are to be monitored, then one Distributed Sniffer must be attached to each physical network segment. Operation of each Distributed Sniffer can be controlled over the network from a network-attached station using an upper level protocol such as TELNET. With this approach, one station located on any attached network segment can view results obtained from each Distributed Sniffer. The clear disadvantage of this approach is the cost of multiple Sniffers. A further shortcoming is a limited ability to correlate information gathered on different Sniffers. In particular, a Sniffer detecting a packet may be unable to determine the network segment on which the packet originated even if that network segment is connected to another Sniffer which has detected the packet, because the two Sniffers may be unable to determine whether the packet they have detected is the same packet or two different packets.

Additionally, each Distributed Sniffer must use some portion of the bandwidth of the monitored network to send information to the monitoring station, and thus the performance of the monitored network is affected.

SUMMARY OF THE INVENTION

According to the invention, monitoring of any or all network segments on a multi-port bridge or router may be carried out from a network segment on one port, referred to as a monitoring port. Packets of a selected network segment attached to a port designated as the monitored port are forwarded to their normal destination ports, if any, and also to the monitoring port. Monitored ports and monitoring ports may be specified in any number, thus allowing, for example, packet traffic from several ports to be simultaneously monitored at one port. To carry out monitoring, a network monitor of conventional design may be connected to the monitoring port and will thus be able to view traffic just as if it were connected directly to a monitored port.

Port monitoring is enabled, disabled and specified via a supervisory access terminal attached to the bridge or router. Alternately, these supervisory functions are carried out from any network-attached terminal using well-known protocols. Using the supervisory access terminal, the network manager is able to define the type of traffic to be copied to the monitoring port. Several traffic types are allowed, for example, monitoring of all packets incoming to a selected port, all packets forwarded to a selected port or all packets generated within the bridge or router and then transmitted on a selected port. In particular, the packets originating on a selected network segment can be isolated for viewing on the network monitor. Further, the monitoring of traffic forwarded between selected pairs of ports is allowed.

Forwarding of a packet from a monitored port to a monitoring port does not require the packet to be copied from one place to another in the bridge's internal buffer memory. Instead, an indirect scheme is specified, that allows a packet to be sent to one or more destination ports without moving the packet. Internal data structures are defined to support efficient packet forwarding and to define the ports to which a packet should be forwarded under various circumstances. The data structures are intended to promote efficient forwarding and also to support simple and regular modification when a port monitoring command is issued from the supervisory access terminal.

Efficiency is also promoted through the use of a Bridging Cache that stores recent forwarding decisions for possible use in the near future.

It is therefore an object of this invention to allow a port monitoring device located on one port to monitor traffic on any other port or ports of the bridge or router.

A further object is to allow selection of the type of packet traffic to be monitored.

It is another object of the invention to controllably restrict monitoring to those packets forwarded from one selected port to another selected port.

Another object of the invention is to "transmit" a single packet to multiple ports in an efficient manner and without the need to make multiple copies of the packet itself.

Yet another object of the invention is to promote an efficient way to carry out the forwarding computations.

It is also an object of the invention to improve the performance of the forwarding computation by caching recent forwarding results in anticipation that they will be used in the near future.

Other objects and features of the invention are described below.

BRIEF DESCRIPTION OF THE DRAWINGS

The foregoing and other objects, aspects and advantages of the invention will be better understood from the following detailed description of the preferred embodiment of the invention with reference to the accompanying drawings, in which:

FIG. 4 exhibits a Bridging Table related to the example system;

FIG. 12 illustrates the Forwarding Table for the example bridge;

FIG. 13 illustrates the Broadcast/Multicast Table for the example bridge;

FIG. 14 illustrates the Management Table for the example bridge;

FIGS. 17A and 17B depict the Forwarding Table and Broadcast/Multicast Table, respectively, after modification to support monitoring of incoming packets;

FIGS. 18A and 18B depict the Forwarding Table and Broadcast/Multicast Table, respectively, after modification to support monitoring of forwarded packets;

FIGS. 20A and 20B depict the Forwarding Table and Broadcast/Multicast Table, respectively, after modification to support port-pair monitoring.

DESCRIPTION OF PREFERRED EMBODIMENT

The purpose of the bridge to be described below is to connect together multiple packet-based segments of a network, allowing efficient communications between stations on each network segment and also between stations located on different network segments connected to the bridge. It is also possible for stations on network segments not connected to a common bridge to communicate, provided that there is at least one segment-to-segment path between the stations.

The example provided here is of a bridge, however, the operation is similar for routers, and the extension to routers will be clear to those skilled in the art.

In some embodiments, network segments attached to the bridge will employ a packet-based communication protocol based on either Ethernet or FDDI. Other packet-based protocols are possible. The details of Ethernet and FDDI protocols are well known and are documented in standards, particularly in IEEE Standard 802.3 for Ethernet and ANSI Standard X3T9.5 for FDDI. The following review of packet communications is intended to establish a terminology for further exposition of the preferred embodiment. The Ethernet scheme will be used as an example.

Figure 1:
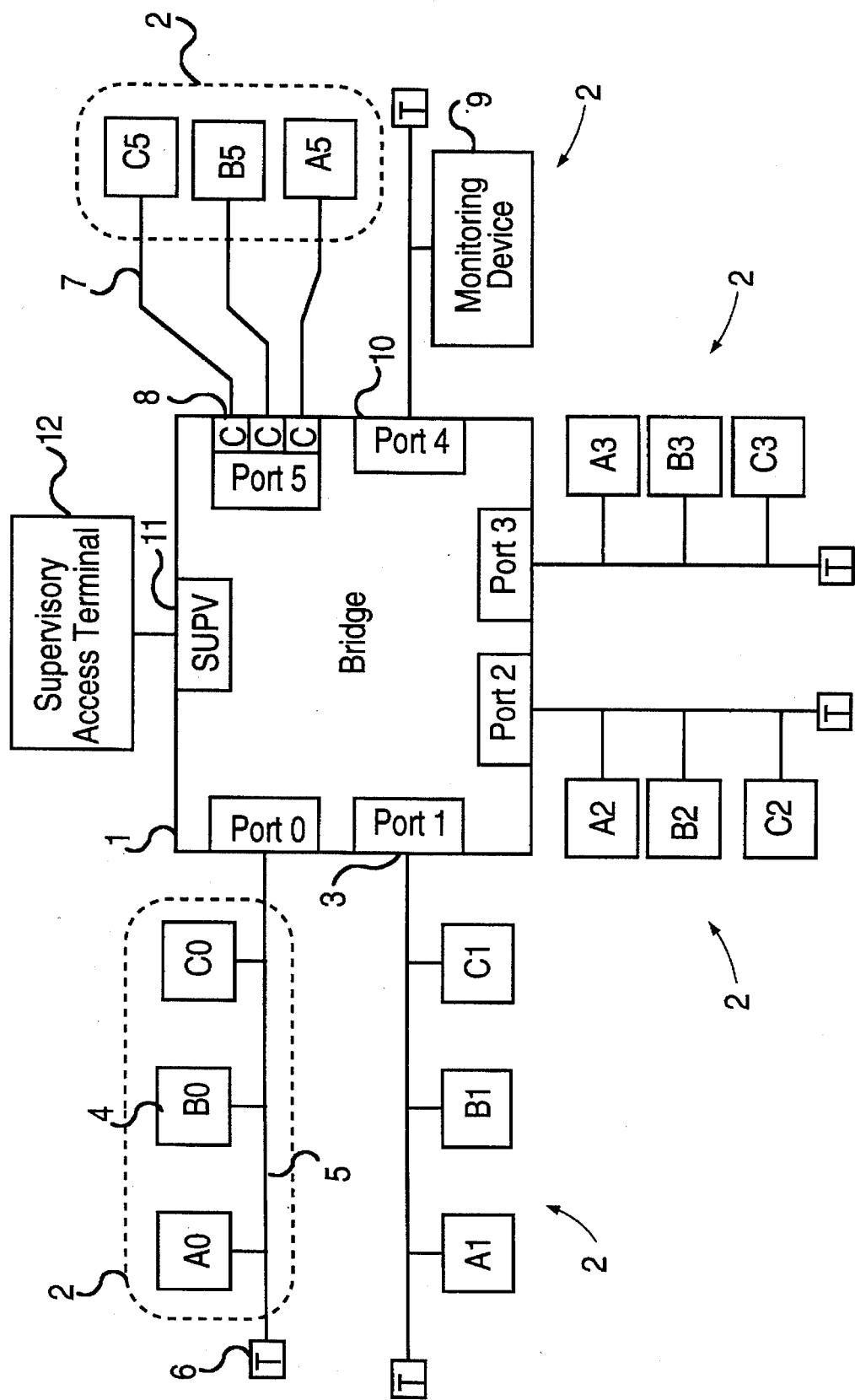
FIG. 1 illustrates an example multi-port bridge with six attached network segments.

FIG. 1 illustrates an example of a bridge with the port monitoring feature. In this example, the bridge 1 provides bridging services to six attached network segments 2 via ports 3 numbered 0 through 5. Item 2 illustrates a typical Ethernet configuration based on "10Base5" technology or "10Base2" technology in which the attached stations 4 are connected via a coaxial cable 5 of the appropriate type. Such a cable would be terminated electrically via terminator 6. An alternative arrangement making use of "10BaseT" technology is shown for Port 5. In this instance, each station is connected via a twisted pair of wires 7 to a unique connection 8 on the port.

Each station illustrated has been given a unique name consisting of a letter followed by a port number. This naming is arbitrary and is used only to simplify discussion in order to illustrate the operation of the invention.

FIG. 1 also shows the attachment of a monitoring device 9 to the monitoring port 10. In the example system and in the discussion to follow, the monitoring port will be Port 4. In some embodiments, the monitoring device 9 will be the only station on the network segment attached to the monitoring port 10. A supervisory terminal 12 may also be attached to the bridge to provide control of the bridge in general and of the port-monitoring feature in particular. In the example system, this attachment is made via a supervisory port 11, which is independent of the other ports illustrated and is only used to provide access to the bridge. It is possible, through the appropriate protocol, to provide access to supervisory terminal services at any of the connected stations 4. In the example system, any or all of the ports 3 may be monitored ports.

Figure 2:
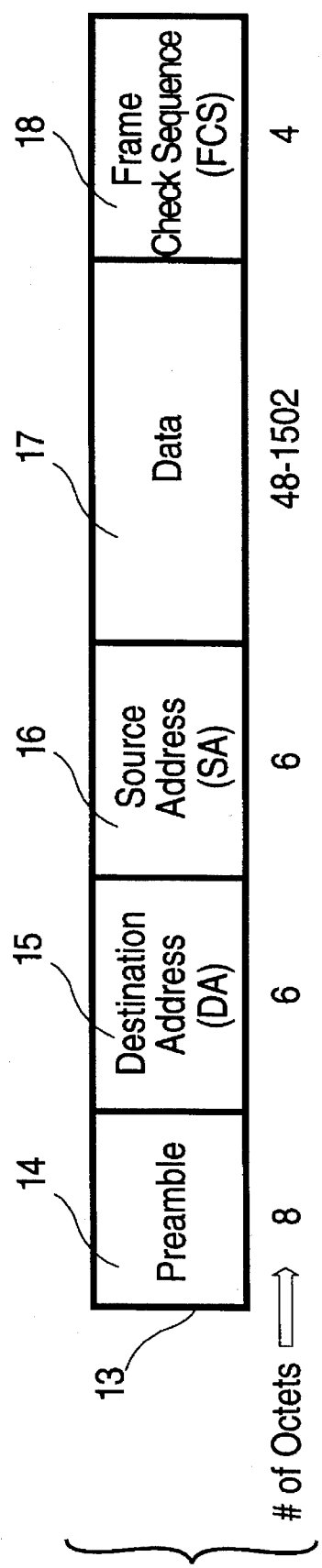
FIG. 2 depicts the format of a packet in conformance with the Ethernet standard.

In order to simplify discussion, it will be assumed that all ports (excepting the supervisory port 11) in the example bridge 1 employ the Ethernet protocol. Under this protocol, stations 4 communicate by sending and receiving packets of information. FIG. 2 illustrates the logical composition of a single packet 13. The packet itself consists of a variable number of octets, or 8 bit data units, and is divided into fields of an integral number of octets as shown. The nomenclature and purpose of the fields is as follows:

Preamble 14—A unique pattern used to synchronize the reception of packets

Destination Address 15—A pattern that specifies the address of the station or stations 4 to receive the packet Source Address 16—A unique pattern specifying the address of the station 4 originating the transmission Data 17—The data to be transferred from the source station 4 to the destination station 4

Figure 3:
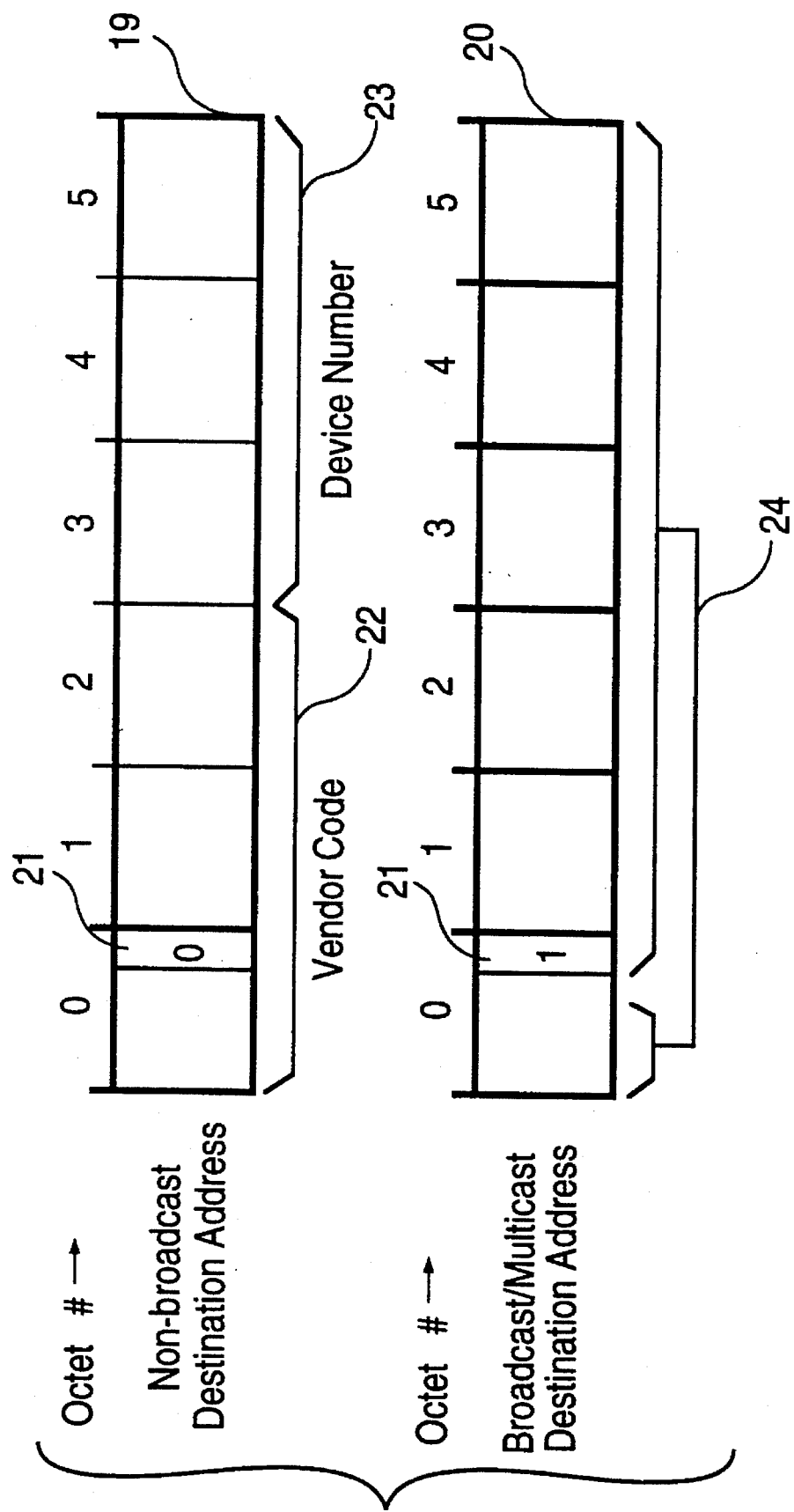
FIG. 3 sets out two formats of packet destination address.

FCS 18—A check sequence over packet (excluding the preamble field) that is used by the destination stations to assess the validity of the received packet FIG. 3 illustrates the formation of the destination address 15 referred to also as DA. For purposes of illustration, two forms of DA may be used. One is the non-broadcast form 19 and the other is the broadcast form 20. A DA 15 consists of 6 octets, or 48 bits, and one of these bits, the Broadcast/Multicast flag 21, is used to differentiate between the two DA forms. When the Broadcast/Multicast flag is zero, the destination address consists of two components: a vendor code 22 and a device code 23. These codes are assigned by a central authority so that each station has a unique station address. The station address is physically associated with the station and is used to identify it, no matter where it may be located on a network, either on a single-segment network or in a larger network composed of multiple segments.

In the case where the Broadcast/Multicast flag 21 is set to one, the DA field 15 is interpreted differently. If the remaining bits of the DA (the Broadcast/Multicast address 24) are all ones, then the destination address is considered to designate all stations in the network, including stations on other segments connected to the bridge 1. In the case where the Broadcast/Multicast flag 21 is one, but the remaining bits of the DA 15 are not all ones, a multicast packet is indicated. The remaining bits then signify a subset of stations in the network that are destinations. Such stations may be attached to any one or different segments. The identification protocol is application dependent and will not be further specified here.

The source address field 16, also referred to as SA, identifies the source station using an addressing scheme as discussed for the DA 15. The SA field does not make use of the Broadcast/Multicast flag, and so the contents of the source address field always consist of the vendor code 22 and device number 23 only and thus uniquely identify the station originating the packet.

Within a single physical network segment 2, such as that composed of stations A0, B0, and C0 of FIG. 1, the operation of the packet protocol is straightforward. Stations transmit packets 13 in which the SA 16 contains their unique station address and in which the DA 15 contains the address of the station they wish to communicate with. Alternately, they can form a DA 15 so that it has broadcast address format 20 and the packet 13 will be received by all stations attached to the segment.

Each station attached to the segment listens to all transmissions on that segment and checks the DA of each packet. A packet is intended for a station's address if a non-broadcast DA matches its station address exactly or a Broadcast/Multicast DA is received. In the case of a Broadcast/Multicast DA 20, the station will receive the packet if the Broadcast/Multicast address 24 matches according to application-specific rules.

BRIDGE OPERATION

The purpose of the bridge 1 is to allow stations on different attached network segments to communicate with each other. There are several advantages to using a bridge rather than simply forming one large common network electronically. By use of a bridge, network segments can be smaller physically (i.e., each segment can contain fewer station) and, therefore, each segment's electrical limits can be more easily met. From a performance standpoint, the transmission capacity of a segment is limited, and therefore the rate at which messages can be transferred between stations on a segment is limited. By subdividing a large segment into a collection of smaller segments connected by a bridge, the overall usage of a connected segment will be reduced on average. In the illustrated example (FIG. 1), for instance, stations on Port 2, such as A2 and C2, may communicate at full segment speed simultaneously while stations on another port, say Port 3, also use the full capacity of their attached segment.

The bridge 1 comes into play when a station on one segment, such as A0, must communicate with a station (or stations) on another segment, say C3. In this case, the bridge must pass packets for the two communicating stations between appropriate ports, in this case between Port 0 and Port 3. Because a station might be portable and thus might move from one segment to another, it is necessary for the bridge to implement an adaptive algorithm. One such prior-art algorithm is described in U.S. Pat. No. 4,597,078, entitled "ridge Circuit for Interconnecting Networks." Bridges constructed according to this algorithm are referred to as "learning bridges." The following brief discussion of learning bridge operation is given here, since this is the preferred mode of bridge operation to which the invention applies.

Figure 4:
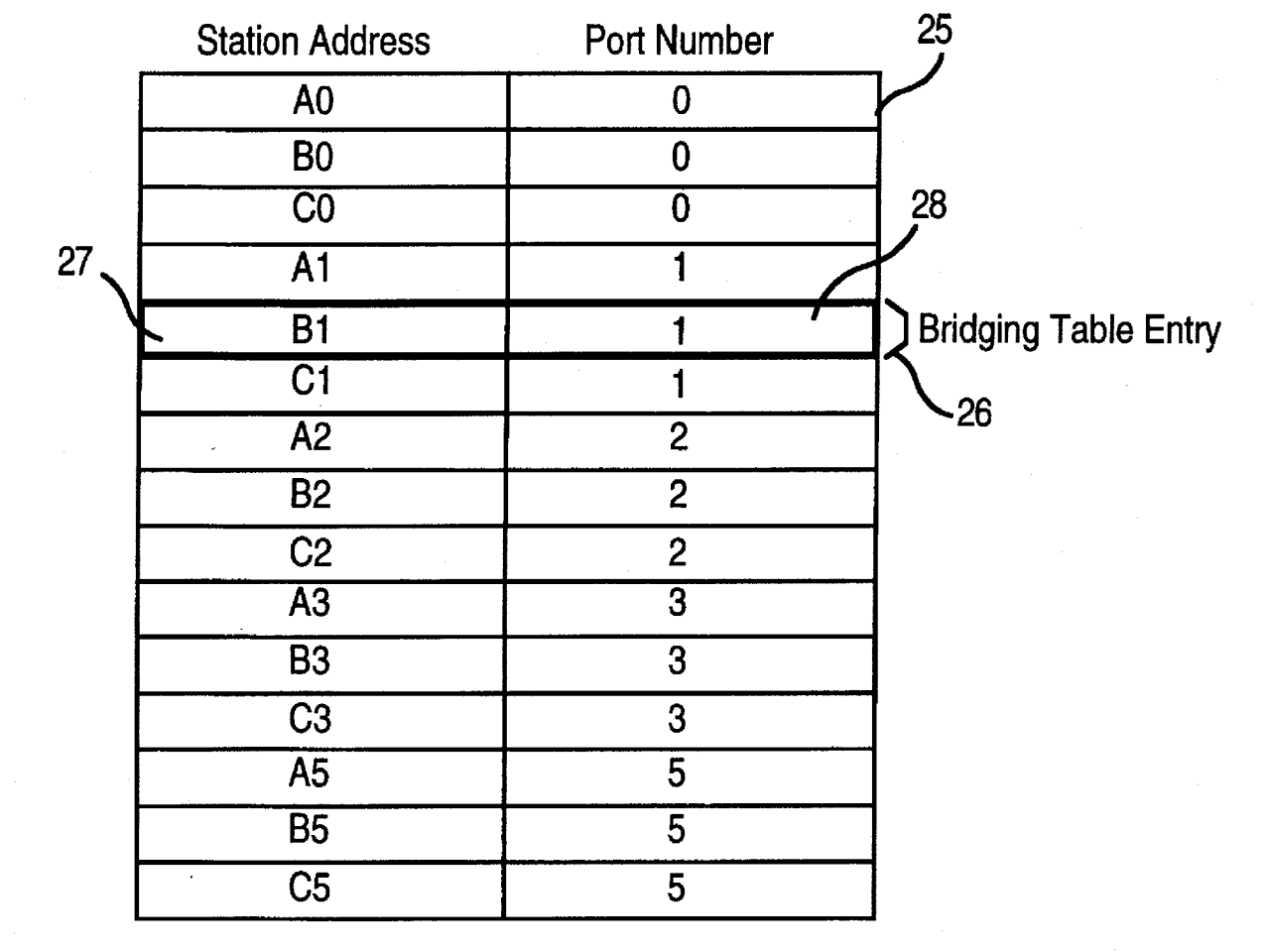

The key to learning bridge operation is that each station 4 has a unique address and that each packet 13 always contains the unique address of the originating station in the SA field 16. In operation, the bridge examines and evaluates all packet transmissions on its attached ports 3. Using information derived from this process, the bridge builds a Bridging Table 25, as illustrated in FIG. 4. Each Bridging Table Entry 26 consists of a Station Address field 27 and corresponding Port Number 28. There is one Bridging Table Entry 26 for each station currently known to the bridge. In the Bridging Table Entry 26 the Port Number 28 indicates the port to which the corresponding station is attached. FIG. 4 illustrates a Bridging Table corresponding to the example bridge and network configuration shown in FIG. 1. In the illustrated case, all bridge-attached station addresses are present in the Bridging Table 25. Because networks have a dynamic character, it is not necessarily the case that all station address/port number pairs will be in the Bridging Table 25 at all times.

In a learning bridge, the Bridging Table 25 is built dynamically by the bridge, as discussed later. Ignoring for now the port monitor feature, the Bridging Table is used to forward received packets to their destinations as follows:

1. If the destination address field 15 of a received packet has the Broadcast/Multicast flag 21 set to one, then the packet is forwarded to all attached ports, except the port on which it was received.

2. If the destination address field 15 of a received packet has the Broadcast/Multicast flag 21 set to zero, then the DA field 15 contains a unique station address. The Bridging Table 25 is accessed using the DA field 15 of the received packet. If the Bridging Table 25 contains an entry with a Station Address field 27 matching the DA field 15 of the received packet, then the corresponding Port Number field 28 is retrieved. There are two cases to consider. If the retrieved port number 28 is identical to the port number on which the packet was received, then the packet is destined for the same network segment as the sending station. In this case, no action is taken as the transmission has already occurred on the proper segment. The alternative case is where the retrieved port number 28 does not match the port number on which the packet was received. In this case, the packet is forwarded to the port number indicated by the retrieved Bridging Table Entry 26.

3. If during the process outlined in 2 directly above, the destination address field 15 of the received packet does not match the Station Address field 27 of any Bridging Table Entry 26, then the packet is forwarded to all attached ports, except for the port on which it was received. This ensures that the destination station, if present on any bridge-attached segment, will receive the packet.

In a learning bridge, the Bridging Table 25 is built dynamically, as packets are received. The bridge examines the source address field 16 of each packet received on each port. If the station address in the source address field 16 of a received packet matches the Station Address field 27 of an entry in the Bridging Table 25 and the port number on which the packet was received matches the port number field 28 of that entry, then the Bridging Table is not modified. However, if the SA 16 of a received packet matches a Station Address field 27 of a Bridging Table Entry 26, but the port number on which the packet was received is not equal to the corresponding Port Number field 28 for that entry, then the Port Number field 28 is written with the port number on which the packet was received. Other actions, such as flushing the Bridging Cache 83 may also be required. However, if the source address 16 of the received packet does not match the Station Address field 27 of any Bridging Table entry 26, then a new entry is added to the Bridging Table 25. This entry consists of a Station Address field 27 containing the SA of the received packet and a corresponding Port Number field 28 containing the port number of the port on which the packet was received.

When the bridge is initialized, the Bridging Table 25 is empty. As packets on the attached network segments are examined, Bridging Table Entries 26 are formed and added to the Bridging Table 25. By this process, the bridge "learns" the correspondence between the attached stations and the port to which they are attached. To accommodate for the fact that networks change and stations may be added, removed or moved from one segment to another, the learning bridge incorporates an aging algorithm to periodically remove Bridging Table Entries 26 that have not been used for a period of time.

It is also possible for a network administrator to configure "permanent entries" in the Bridging Table. This avoids the need for the bridge to learn such entries, and can also be used to enhance network security. For example, the bridge could be configured not to forward packets to any DA on a particular port unless the Bridging Table contains a permanent entry for that DA, matching that port.

A further complication of bridge operation is that bridge 1 is typically part of a large network consisting of many bridges and their attached segments. The topology of the network might include loops in which there is more than one network path between two bridges. This may be unintentional or intentional, for example where redundancy is required in the network. In the case of broadcast packets or when a received packet has a DA 15 field for which no matching Bridging Table Entry 26 exists, the packet is forwarded to all ports. If network loops are present, this forwarding activity can lead to infinite duplication and propagation of a packet. To prevent this, the learning bridge implements an algorithm, referred to as a "spanning-tree algorithm", that limits the ports to which packets of the type discussed above can be forwarded. This algorithm is well defined by IEEE Standard 802.1d. Operation of the spanning-tree algorithm requires that the bridge 1 form an internal map of the network to which it is attached. This is done by communicating periodically with other bridges attached to the segments that are attached to the bridge 1. Thus, there are instances in which the bridge itself may generate packets for transmission even though it has not received any specific packets instructing it to do so.

CUSTOM FILTERING OF PACKETS

Figure 5:
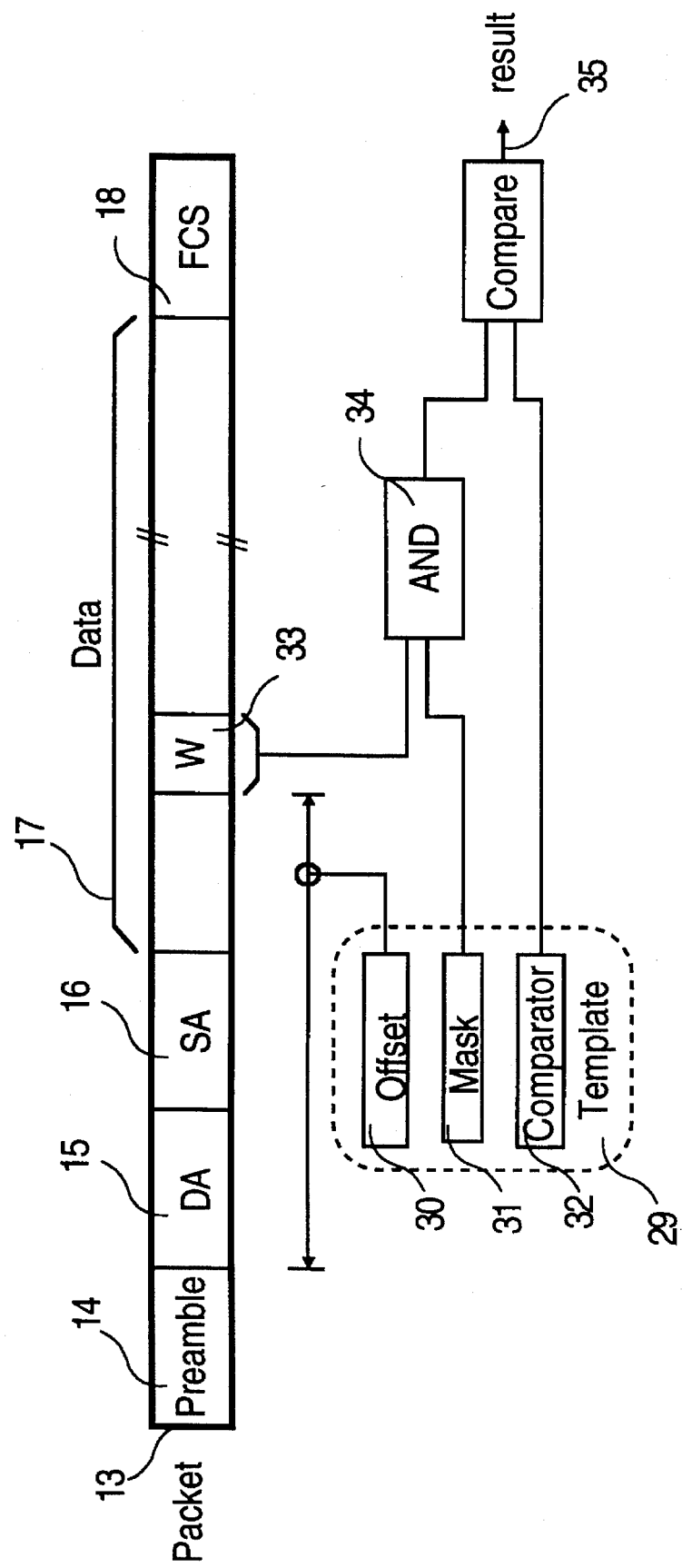
FIG. 5 shows the evaluation of a Custom Filtering Rule.

In the forwarding operation discussed above, the bridge makes forwarding decisions based only on the DA field 15 of a packet 13. However, more useful bridge operation can be had by further qualifying the forwarding decision based on specific contents of each packet. Under this additional regime, the forwarding of certain packets may be suppressed (that is, they are filtered out) if conditions based on packet contents are met. These conditions are referred to here as custom filtering rules (CFRs) and are implemented through the use of templates 29 as shown in FIG. 5.

A template 29 consists of three components, an offset 30, a 32-bit mask 31, and a 32-bit comparator 32. The template defines a test to be applied to a packet according to the following algorithm. First, the offset 30 is used to identify the start of a four-octet field, W, 33 of the packet. Offset 30 is expressed in octets from the start of the destination field 35. The identified field, W, 31 is then logically ANDed bit for bit with the 32-bit mask 31. The 32-bit result 34 is then compared logically (bit for bit) with the comparator 32 of the template yielding a logical result 35 which is true or false. If the result 35 of template evaluation is true (i.e., the result 34 equals the comparator 32), then the packet is not forwarded (i.e., it is filtered). In the preferred embodiment, the filtering algorithm is implemented with software; however, a strictly hardware implementation or a mixed hardware/software implementation is also possible.

It is intended that the bridge 1 should provide for a plurality of templates and that facilities be provided to allow for multiple templates to be evaluated against a given packet and for the results of such evaluation 35 to be combined according to the well-known rules of Boolean logic. Thus, filtering of a packet can be based on quite complex conditions. These complex conditions are referred to here as "custom filtering rules," or "CTFs." Through the proper construction of templates and CFRs, it is possible to filter out quite specific types of packets. For example all Apple-Talk packets with an Appletalk source address of 15 (Hex) could be filtered by setting an offset of 16 (decimal), a mask of FF000000 (Hex), and a comparator of 15000000 (Hex). This might be used to prevent a particular station from communicating via Apple Talk protocol with selected other stations.

To further enhance the usefulness of CFRs, it is intended that the bridge allow for the association of CFRs with the port on which the packet is received, the SA 16 of the received packet, the DA 15 of the received packet, and the destination port (or ports) to which the packet is forwarded. Various combinations of such associations are also possible.

In the example bridge implementation, templates 29 and rules are defined through the use of the supervisory access terminal 12.

SUMMARY OF BRIDGE OPERATIONS

From the discussion above, it will be seen that the bridge is able to handle several situations reflecting the various packet generating and forwarding situations. In summary, these include:

1. Forwarding of a single packet from one port to another.
2. Forwarding of multicast and broadcast packets to more than one port and possibly all ports.
3. Forwarding of management packets generated from within the bridge.
4. Suppression of packet forwarding to particular ports due, for example, to operation of the spanning-tree algorithm or for security purposes.
5. Filtering (suppression) of packet forwarding due, for example, to the evaluation of custom filtering rules (CFRs).

ROUTER OPERATION

The discussion above has been related explicitly to bridges. However, the invention to be discussed also applies to routing. Packet routing involves receiving a packet on a port (i.e., from an attached network) and retransmitting it to another port based on information contained in the Data field 17. The DA of a packet to be routed will be either the station address of the router or a broadcast/multicast address. The SA 16 is the station address of the station or router originating the packet. The router may be physically and/or logically incorporated in a bridge. (Devices which combined router and bridge functionality are known as "routers".)

When a packet arrives at a router, the Data field 17 is parsed and examined. Specific protocols are defined for each type of packet to be routed and are indicated by sub-fields in the packet Data field 17. One of the sub-fields may be a network address which is a logical, rather than a physical, address indicating the ultimate destination of the packet. To route the packet, the router modifies the DA 15 to point to the next link or hop in the route and substitutes its own address for SA 16. Sub-fields of the Data field 17 may also be modified. In particular, there is usually a "hop count" indicating the maximum number of hops a packet may traverse before it is considered invalid or mis-routed. Other sub-fields of Data 17 may include control options, length, type, serial number, priority and so forth. These sub-fields are used to further specify the route.

CFRs may be applied to routed packets just as they are to bridged packets. It is also the case that some routed packets are consumed by the router or possibly generated internally for transmission to other routers. Thus it will be seen that routed packets can generate packet forwarding situations similar to those arising for bridges, as discussed above under "Summary of Bridge Operations."

BRIDGE HARDWARE IMPLEMENTATION

Figure 6:
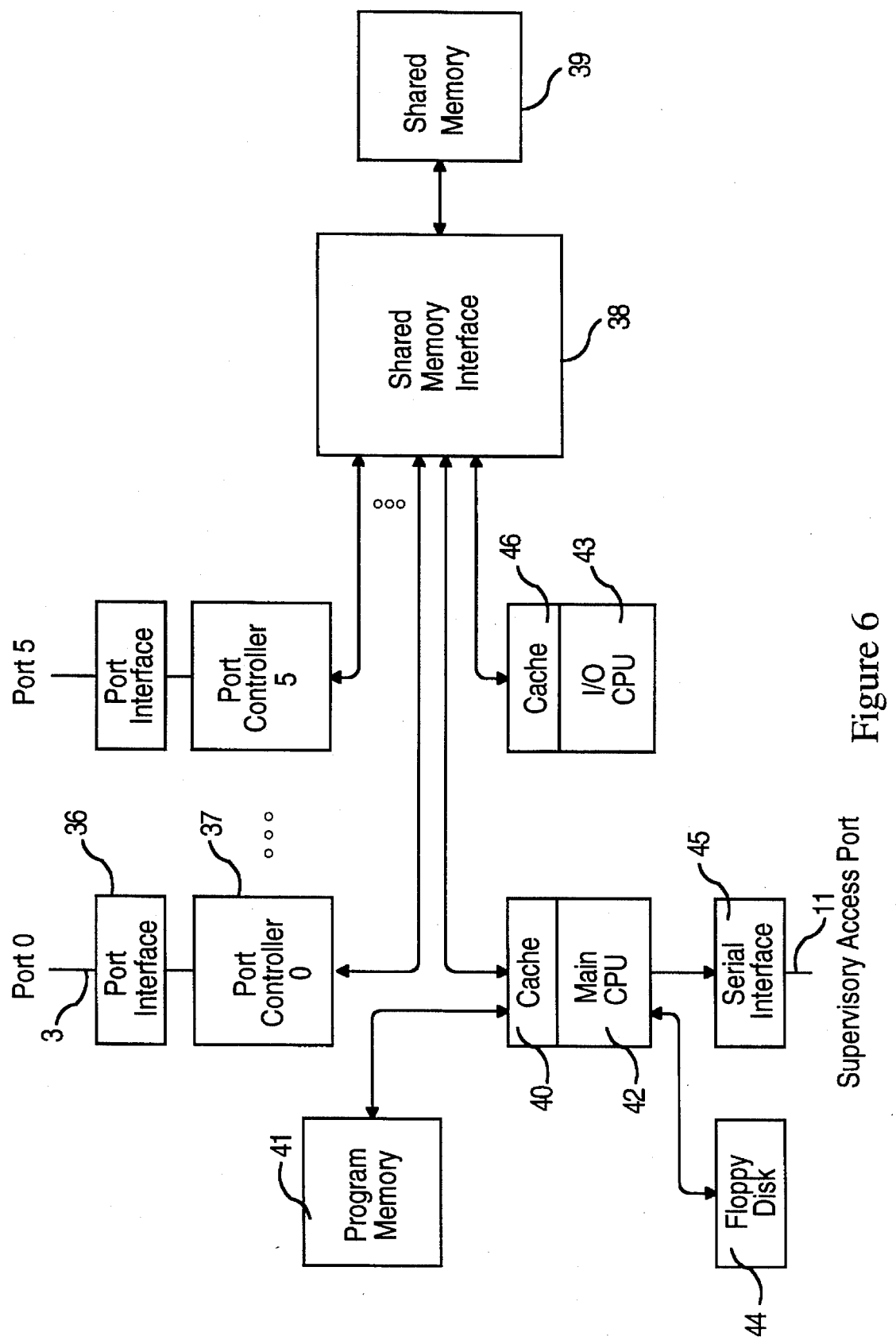
FIG. 6 is a block diagram of the example bridge.

FIG. 6 illustrates the hardware of the example bridge 1 in block diagram form. In keeping with the example bridge discussed above, only 6 port controllers 37 are illustrated, although those skilled in the art of hardware system design will see that the design may be readily extended to additional ports 3. Each port is based on the ILACC 32-bit Ethernet Controller, available from Advanced Micro Devices (AMD) of Sunnyvale, Calif. These controllers have the capability of sending and receiving packets directly to and from the shared memory 39 via the shared memory interface 38 without direct intervention of the bridge Main CPU 42 or I/O CPU 43. This process will be discussed further below.

The bridge contains two processors whose primary function is to examine packets stored in the shared memory and make the appropriate changes to shared memory tables and data structures to allow forwarding to take place. The main CPU 42 is based on the MIPS R3001 25 MHz processor from Integrated Device Technology (IDT) of Santa Clara, Calif. Associated with the chip is a 256 K Byte cache memory in which frequently referenced portions of the real-time packet forwarding code and control data are held. An attached Program Memory 41 contains up to 8 MBytes of additional storage for less time critical software and data, such as that related to the supervisory access function. A serial interface 45 is connected to the Main CPU to provide the Supervisory Access Port 11. Also connected to the Main CPU 42 is a Floppy Disk 44 that provides a convenient means of updating the system software and saving configuration information, such as permanent Bridging Table entries and CFRs, to be read at system startup.

A second processor, the I/O CPU 43, is based on a MIPS R3051 33 MHz processor also available from IDT. The primary purpose of this processor is to supervise the sending and receiving of packets 13, manage Packet Buffers in shared memory 39, handle packet reception errors and similar activities. This processor supports an onboard cache 46, which holds all of the I/O CPU code, thus providing very high performance.

Packets received from the ports and packets generated within the system to support management functions are stored in the shared memory 39, which is based on a 1.5 Mbyte array of SRAMs. The structure of typical shared memory 39 is described in patent application "Methods and Apparatus for Data Transfer Between Source and Destination Modules," Ser. No. 07/304,053, now U.S. Pat. No. 5,237,670. The configured array has an aggregate bandwidth of 400 Mbytes/second. Shared memory is made available to the port controllers 37, the Main CPU 42, and the I/O CPU 43 via the shared memory interface 38. Each Port controller 37 is allocated 32 Kbytes of shared memory for received packets and 64 Kbytes of shared memory for transmitted packets.

PACKET DESCRIPTOR FORMAT

Packet forwarding is the process by which a received packet (or possibly one generated internally) is transmitted on one or more ports 3. While the forwarding decisions are made primarily by the Main CPU, the port controllers 37 and the I/O CPU 43 also participate in the mechanics of forwarding.

Figure 7:
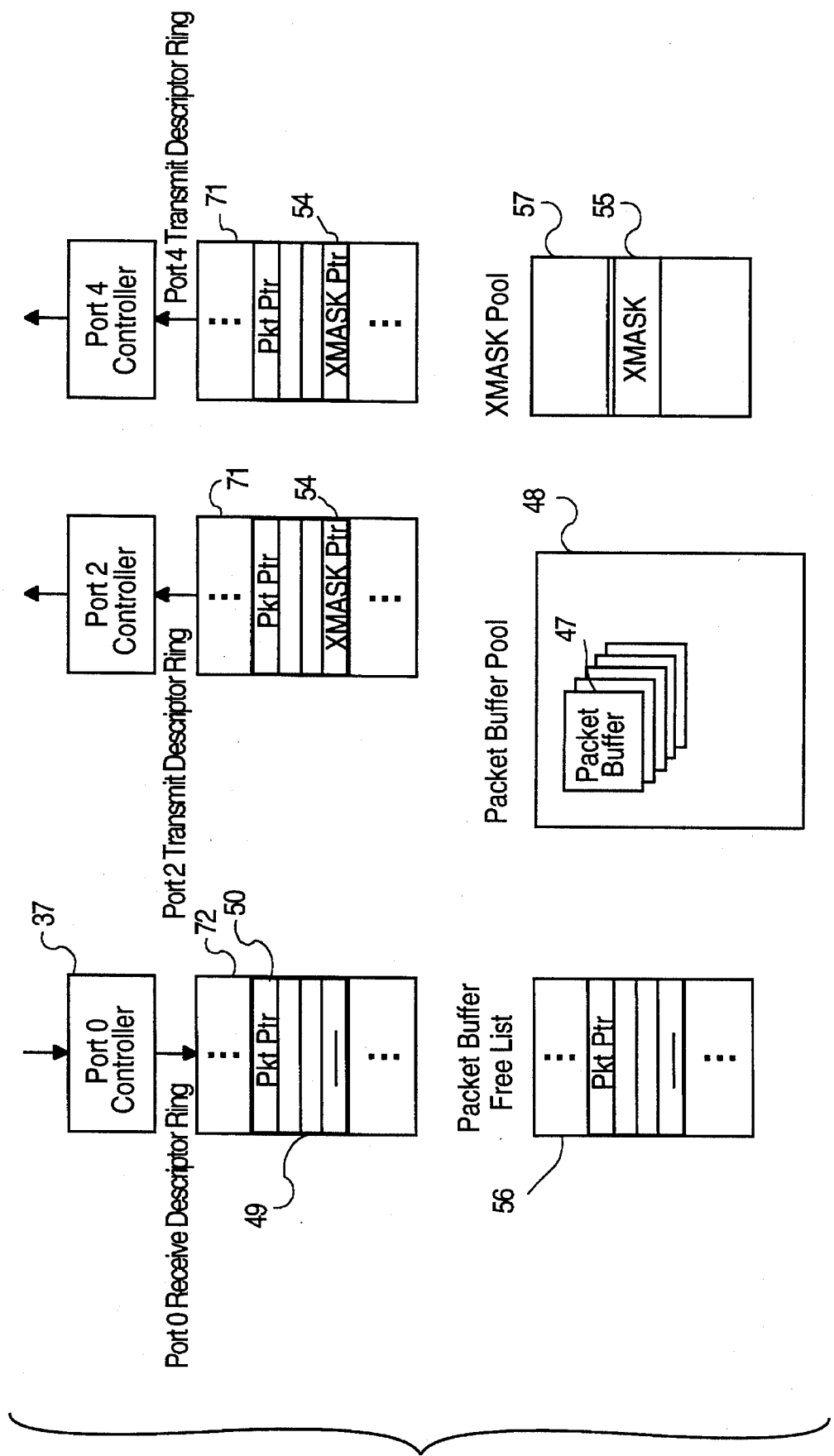
FIG. 7 depicts shared memory data structures related to packet reception and transmission.

FIG. 7 shows shared memory 39 data structures involved in the reception, forwarding, and transmission of packets. Portions of these data structures can be manipulated by the port controllers, Main CPU and I/O CPU. Packets being processed are stored in Packet Buffers 47 maintained in the Packet Buffer Pool 48. Each Packet Buffer 47 is a contiguous shared memory area sufficient to hold an average sized Ethernet packet (of up to 256 octets). When longer packets must be handled, several Packet Buffers 47 are used.

Figure 8:
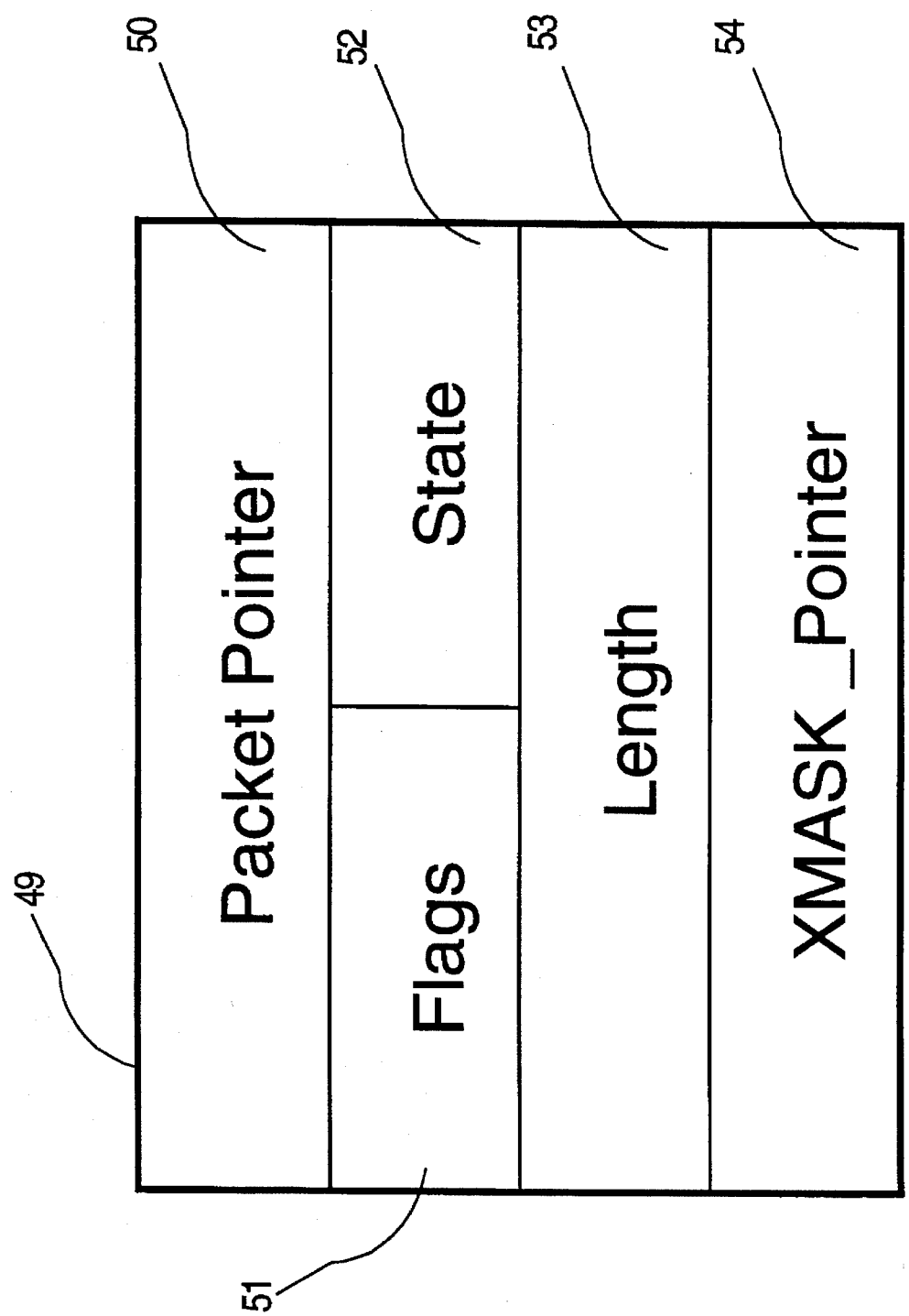
FIG. 8 illustrates the format of a Packet Descriptor.

Because even a minimum-size packet contains a considerable number of bytes (64), it is desirable to handle packets indirectly. This is done by means of a Packet Descriptor 49, as shown in FIGS. 7 and 8. A Packet Descriptor 49 is a shared-memory data structure and has five components. The packet pointer 50 points to the actual packet data held in a Packet Buffer 47 in the Packet Buffer Pool 48. As packets are processed, the Packet Descriptor 49 may be copied or moved. ("Move" means to copy and delete the original.) However, the packet itself is not moved or copied, it is only referred to via the packet pointer 50. This indirect approach saves considerable shared-memory space and access bandwidth.

Flags 51 within the Packet Descriptor indicate various conditions related to packet status, such as the presence of errors and their causes. Packet processing is directed by the State field 52 of the Packet Descriptor. Details of packet processing and State field 52 manipulation will be discussed below. The Length field 53 indicates the length of the packet within the Packet Buffer 47.

Figure 9:
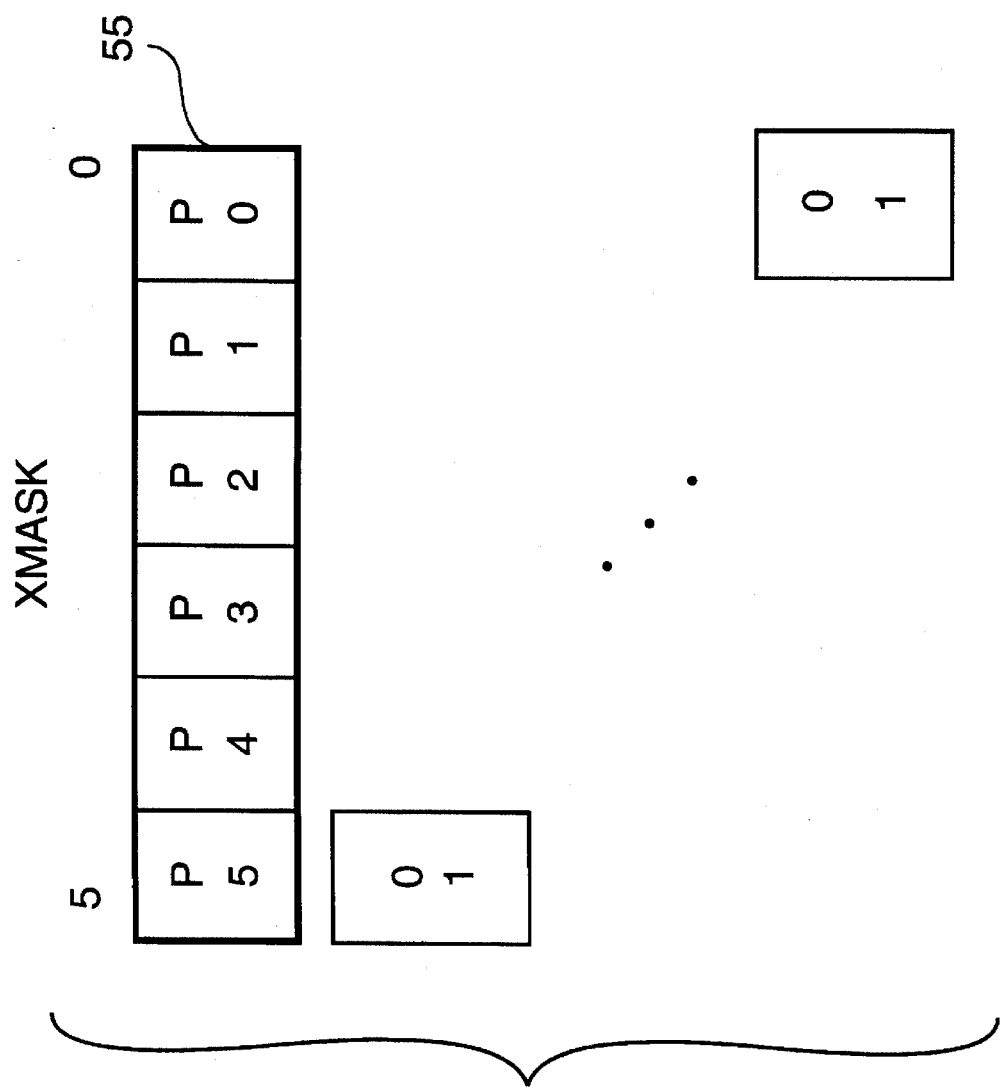
FIG. 9 illustrates the format of the XMASK.

Within the Packet Descriptor 49 is the XMASK-Pointer 54 that points to an XMASK 55 indicating the destination port or ports (if any) to which the packet is to be transmitted. During forwarding, the Main CPU 42 fills in the XMASK-Pointer field based on the forwarding algorithm and conditions in effect at the time a packet is processed. Execution of the forwarding algorithm produces a data quantity referred to as an XMASK 55 and illustrated in FIG. 9.

XMASK 55 is simply a bit vector in which each bit indicates a port 3 to which the packet 13 is to be dispatched. Bit value "0" means, "Do not dispatch to the respective port", and bit value "1" means, "Dispatch to the respective port". If multiple bits are set, then the packet will be dispatched to each port indicated. If no bits are set, then the packet will not be dispatched (forwarded) to any port. For purposes of discussion and illustration, XMASK 55 will be represented in binary with the rightmost bit being the least significant bit and designating port 0. Table I shows some examples of XMASK values for the 6 port example system.

TABLE I

| Examples of XMASK | |
|---|---|
| XMASK | ACTION |
| 000000 | Do Not Dispatch |
| 000001 | Dispatch to Port 0 only |
| 010011 | Dispatch to Ports 0,1 and 4 |
| 111111 | Dispatch to All Ports |

A computed XMASK value 55 related to a packet 13 is held in the XMASK Pool 57, a data structure in shared memory 39. Within the Packet Descriptor 49, the XMASK-Pointer field 54 will point to the computed XMASK 55 in the XMASK Pool 57. This allows multiple Packet Descriptors 49 to point to the same XMASK value 55 and facilitates dispatching the same packet 13 to several ports, as would be required in a Broadcast/Multicast situation or when port monitoring is enabled.

For purposes of explaining the invention, some simplifications to the form of XMASK 55 have been made and certain optimizations will be evident to those skilled in the art. For example, when XMASK 55 designates only one destination port, the port number itself may be held directly in the XMASK-Pointer 50 if a flag designating the alternate format is provided. This may be more efficient on some hardware systems.

PROCESSING OF PACKETS

Figure 10A:
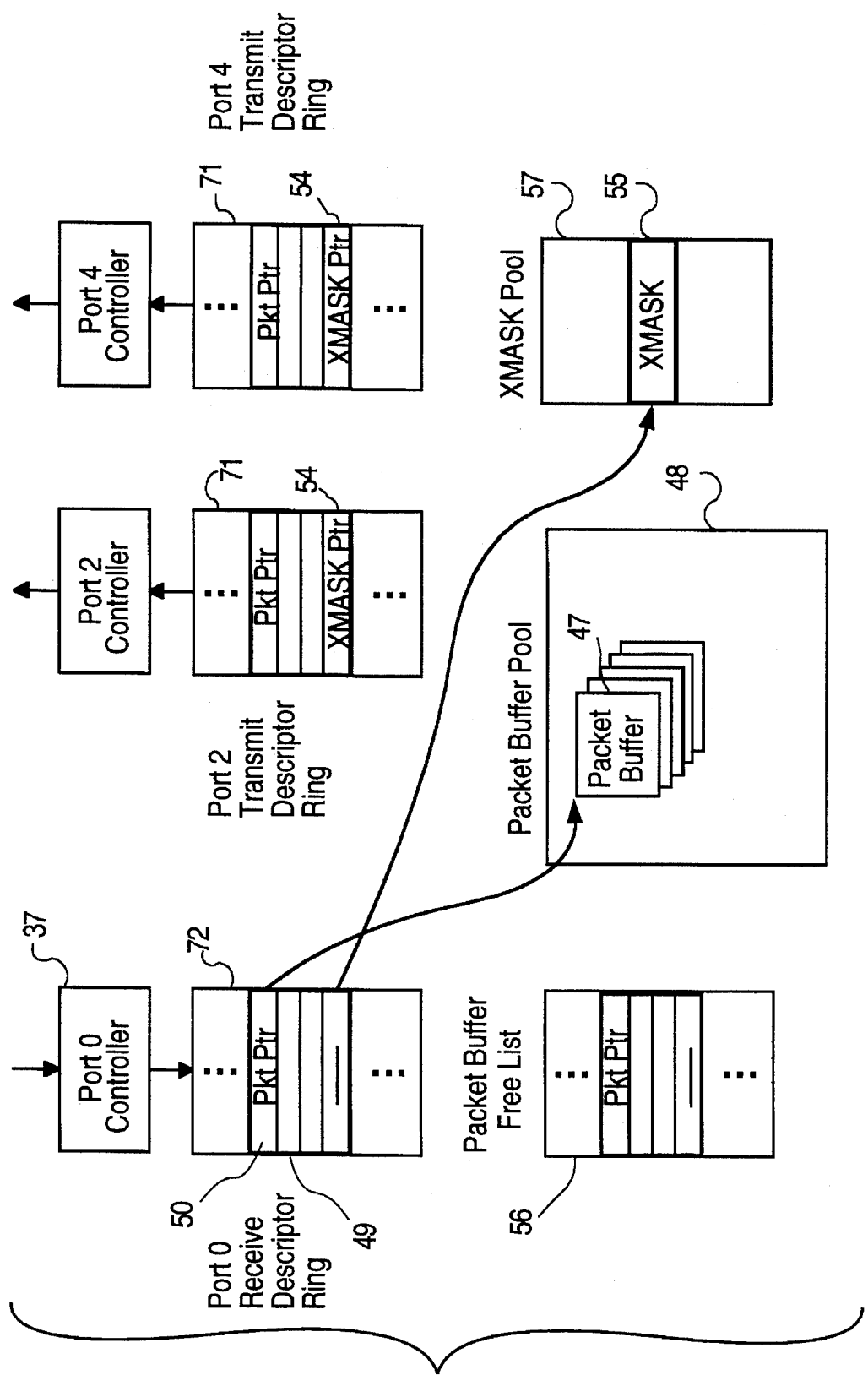
FIGS. 10A and 10B illustrate the reception of a packet and the transmission of a packet, respectively.
Figure 10B:
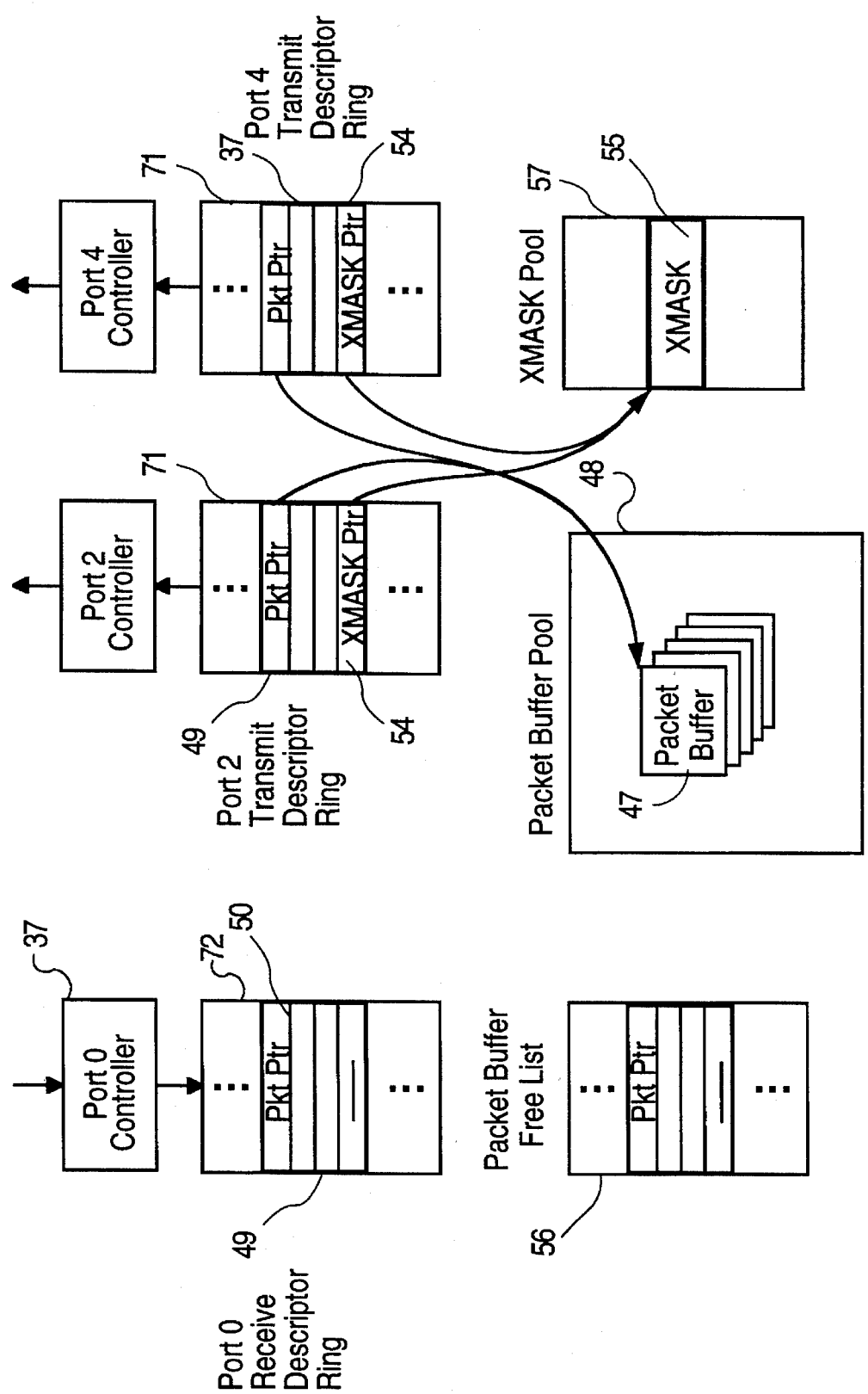
Figure 11:
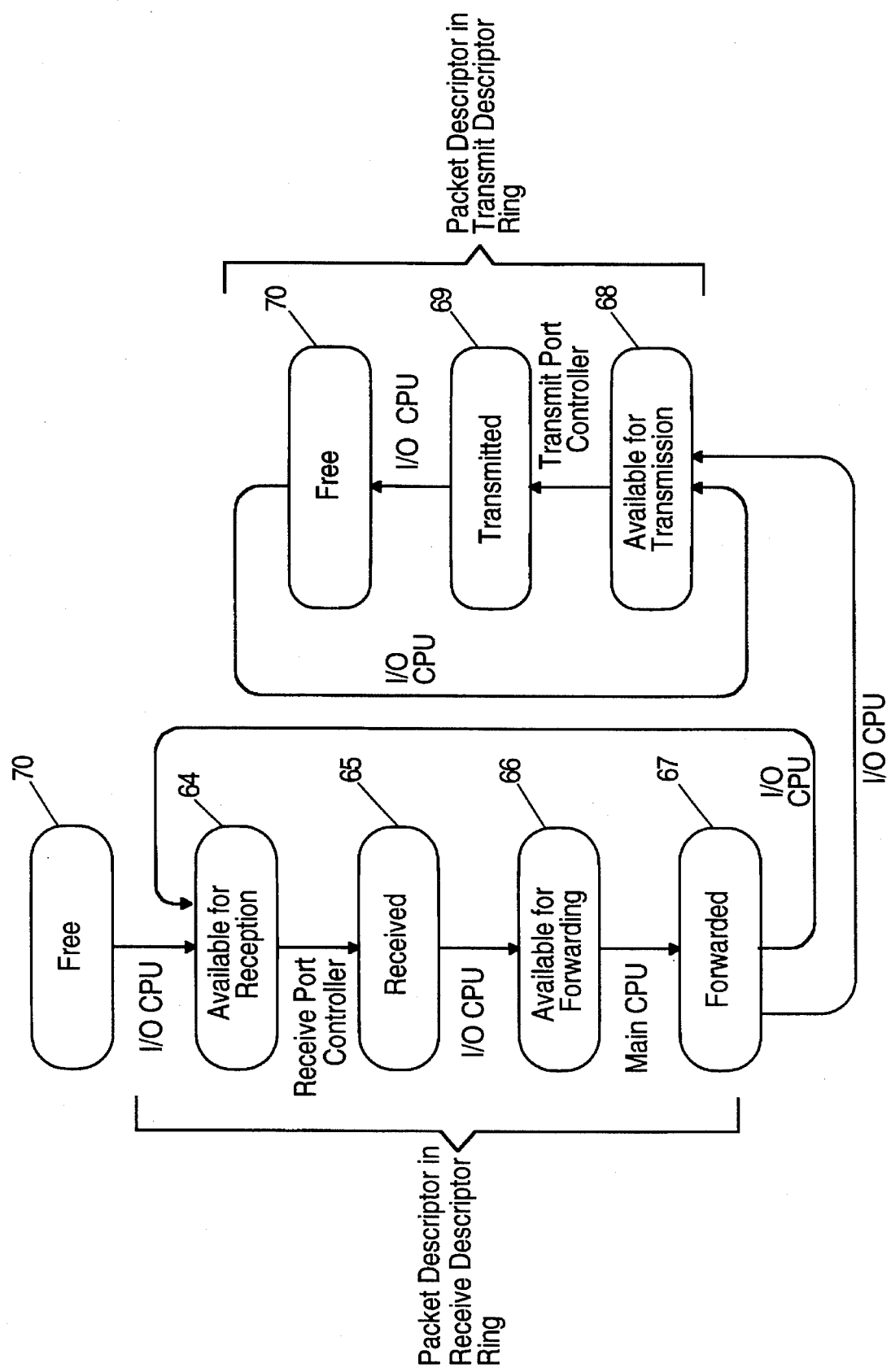
FIG. 11 is a state diagram illustrating the sequencing of Packet Descriptor state.

Packet processing will be explained by way of example using FIGS. 10A and 10B, which illustrate changes to the shared memory data structure as packet processing progresses. Use will also be made of FIG. 11 showing the sequence of processing steps. During packet processing, the actual Packet Buffer 47 is not moved or copied in shared memory 39. Instead, the Packet Descriptor 49 associated with that packet buffer is moved from one shared memory data structure to the next and possibly copied and/or modified. In particular, the State field 52 of the Packet Descriptor 49 is modified according to the sequence outlined in FIG. 11 where enclosed text, such as 64, 65, 66, 67, 68, 69 and 70 represent states. What is shown in FIG. 11 is the normal sequence of state processing where no errors have occurred.

In the example provided here, it is assumed that a packet will be received on Port 0 and sent to Ports 2 and 4. Initially, the configuration of memory will be as shown in FIG. 10A. Associated with each port controller is a Receive Descriptor Ring (RDR) 72 and Transmit Descriptor Ring (TDR) 71 realized in shared memory FIGS. 10A and 10B only illustrate the RDR for Port 0 and the TDR for Ports 2 and 4. Receive and Transmit Descriptor Rings (72 and 71) are circular data structures of well known design and are of a fixed size designed to hold an integral number of Packet Descriptors 49. Descriptor ring size is a design choice based on various system parameters of the particular implementation.

Initially, the RDR 72 will contain one or more Packet Descriptors 49, each with a State field 52 marked "Available for Reception" indicating that the associated Packet Buffers are available for the port controller 37 to fill with received packets. One Packet Descriptor in the RDR will be designated as to the next to be filled packet. Each "Available for Reception" Packet Descriptor 49 in the RDR will point to an empty Packet Buffer 47 in the Packet Buffer Pool 48 which is a data structure held in shared memory. With respect to the state diagram in FIG. 11, the Packet Descriptor 49 is in the "Available for Reception" state 64. When a packet arrives at Port 0, the Port 0 controller 37 will transfer the data received to the Packet Buffer 47, as directed by the Packet Pointer field 50 of the Packet Descriptor 49. In the preferred implementation, this process is under the control of the Port Controller 37 and occurs independently of other processes on other port controllers and processes on the Main CPU 42 and I/O CPU 43. It will be recognized, however, that other approaches to providing independent processes are possible.

Once the Port 0 Controller has placed the received packet in the Packet Buffer 47, it will update the Packet Descriptor 49 by supplying the proper Length field setting Flags 51 as required, and changing the State to "Received" 65 as shown in FIG. 11. At this point, Port Controller 0 will access the next "Available for Reception" Packet Descriptor 49 in preparation for receiving a new packet.

Independently of the Port Controller operation, the I/O CPU 43 supports a process that polls each Port RDR and inspects the Packet Descriptors 49. When a Packet Descriptor 49 is found to be in the "Received" state the I/O CPU 43 will process the packet checking for packet errors and updating receive statistics (such as number of packets received on this port). Upon completion of this process, the State field 52 of the Packet Descriptor 49 is marked as "Available for Forwarding" 66.

The Main CPU 42, working independently of the Port Controller 37 and the I/O CPU 43, periodically polls all RDRS 72 to determine if any queued packets are to be forwarded. Based on the SA 16 and DA 15 fields of the Packet 13 and upon the port number of the RDR 72, on which the packet is queued (RPORT), the Main CPU will carry out the Forwarding Algorithm as in FIG. 16. The result of this process will be an XMASK value 55 designating the port or ports (possibly none) to which the packet 13 is to be forwarded. This XMASK 55 value will be placed in an available entry in the XMASK Pool 57 and the appropriate pointer to the entry will be entered into the XMASK-Pointer field 54 of the Packet Descriptor 49. The State field 52 of the Packet Descriptor is then changed to "Forwarded" 67.

Periodically, the I/O CPU 43 will scan the RDRs 72 to determine if any Packet Descriptors 49 are in a "Forwarded" state 67. When such a Packet Descriptor 49 is found, it will be copied to each TDR 71 (if any) as indicated by the set bits in the associated XMASK value 55. The State field 52 of each Packet Descriptor 49 copied to the TDR 71 is changed to "Available for Transmission" 68. Each Packet Descriptor 49 copied to a TDR 71 will contain a Packet Pointer 50 pointing to the packet in the Packet Buffer Pool 48 and an XMASK-Pointer 54 pointing to the XMASK value 55 in the XMASK pool 57. Once the I/O CPU 43 has copied a Packet Descriptor 49 to the appropriate TDRs 71, the Packet Descriptor in RDR 72 is marked "Available for Reception" 64 and linked to an empty Packet Buffer 47 from the Packet Buffer Pool 48. FIG. 10B illustrates the situation after the example packet has been forwarded to the TDRs for ports 2 and 4.

Transmission of packets is carried out independently by the Port Controllers 37. Each Port Controller 37 scans its associated TDR 71 and on encountering a Packet Descriptor 49 with a State field 52 marked "Available for Transmission" 68 will begin transmitting the Packet 13 from Packet Buffer 47 to its associated port. Upon completion of the transmission, the State field 52 is marked "Transmitted" 69. When a packet is sent to two or more ports, it may be transmitted at different times, since packet transmission on a particular port depends on the state of the TDR associated with that port and the traffic queued on that port.

Clean up of the TDR 71 is carried out by the I/O CPU 43, which periodically scans all TDRs 71. When a Packet Descriptor 49 with a State field 52 marked "Transmitted" 69 is found, the bit in the XMASK 55 designated by the XMASK Pointer 54 corresponding to the port under examination is reset. If the XMASK 55 is now cleared, there are no more outstanding Packet Descriptors 49 associated with the packet 13; therefore, the Packet Buffer 47 is free and may be linked to a position on the Packet Buffer Free List 56 for later reuse. The Packet Descriptor 49 on the TDR 71 is marked as "Free" 70 making it available for reuse. Similarly, the XMASK 55 is made available for reuse in the XMASK Pool 57.

Other issues related to packet processing, such as error handling and statistics gathering, have not been detailed here. The appropriate method of handling such issues is dependent upon the particular implementation and will be clear to those skilled in the art.

FORWARDING DATA STRUCTURES

Primary responsibility for forwarding packets resides in the Main CPU program. For purposes of illustrating the present invention, the data structures and operation of the forwarding algorithm will be discussed below. Only those features directly related to the port monitor feature will be explained. Initially, the discussion will be restricted to normal forwarding (i.e. when port monitoring is disabled). It will be seen that the proposed data structures support rapid computation of the XMASK value 55, which is used to direct packet forwarding. Once the normal case has been presented, the adjustments to the data structures necessary to provide port monitoring will be explained. These adjustments will also be seen to be particularly efficient in terms of implementation and execution.

Forwarding of a packet 13 is based on several inputs and produces, as an output, an XMASK value 55. Required algorithmic inputs are DA 15—the destination address of a received packet, RPORT—the port number on which the packet was received, SA 16—the source address of the received packet, RSTATE—the state of the receiving port (RPORT 85), NG—the network groups, and the current CFRs in effect.

RSTATE reflects the state of the receiving port. This is a port specific indicator (one per port) and indicates whether packets arriving at a port from its attached segment should be forwarded and whether packets from other ports or the packets generated within the bridge itself (management packets) may be forwarded to the port. RSTATE for a port varies slowly relative to the reception of packets and usually remains static for a long period of time. For example, RSTATE changes during the execution of the spanning-tree algorithm as ports are enabled and disabled to prevent logical loops.

NG, Network Groups, define which bridge-connected ports are allowed to communicate. NG values are defined by a network administrator using the supervisory terminal 12 or its network-based equivalent connection. Like RSTATE, NG values remain static for long periods of time relative to the transmission time of packets.

Because CFRs (Custom Filtering Rules) control packet transmission based on packet contents, possibly Data Field 17 contents, CFRs when specified will have a dynamic effect on packet forwarding. That is, each packet arriving at a port (RPORT 85) with the same SA 16 and DA 15 may be forwarded differently. Thus CFRs must be evaluated for every packet forwarded between ports and specific addresses (SA 16 and DA 15) for which CFRs are currently defined. The discussion below initially assumes that CFRs are not in effect.

Figure 15:
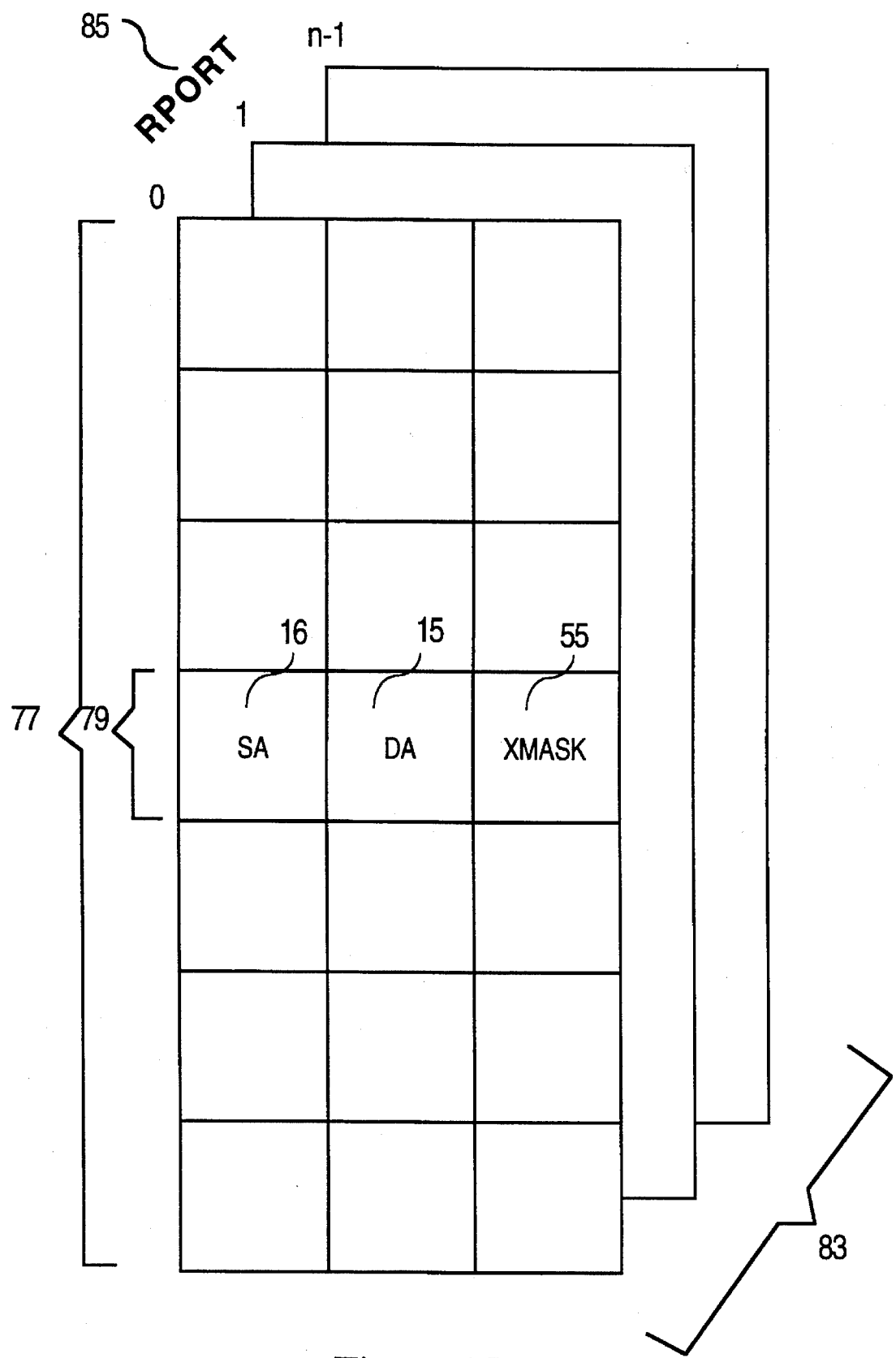
FIG. 15 depicts a Bridging Cache.

In operation, forwarding will depend on several data structures, the Bridging Table 25 (FIG. 4), the Forwarding Table 80 (FIG. 12), the Broadcast/Multicast Table 81 (FIG. 13), Management Table 82 (FIG. 14), and the Bridging Cache (FIG. 15). The structure of the Bridging Table 25 has been discussed above.

FIG. 12 illustrates the Forwarding Table 80. This data structure is a two-dimensional array. One index of the array is RPORT 85, the number of the port on which the packet to be forwarded was received. The other index is XPORT 86, the number of the port on which the packet is to be sent based on the DA 15 field. XPORT 86 is determined by accessing the Bridging Table 25 with DA 15 and retrieving the corresponding Port Number field 28. Entries in the Forwarding Table 80 are XMASK values 55 and reflect the current port-to-port connectivity of the bridge based on NG and RSTATE. For normal forwarding (port monitoring not in effect) XMASK 55 will either be null (all zeroes) or will indicate a single port. FIG. 12 illustrates an example Forwarding Table 80 for a typical situation where all ports may communicate with each other. Null (all zeroes) XMASK values along the diagonal of the Forwarding Table indicate that if RPORT 85 is equal to XPORT 86 the packet should not be forwarded since the destination station is on the same port as the source station.

In the Forwarding Table 80 example of FIG. 12, it is also assumed that Port 4 is isolated logically from all other ports.

In the monitoring examples that follow, the monitoring port 10 will be Port 4. In some embodiments, the Monitoring Port 10 is isolated logically so that only specifically identified monitored packets appear on the attached network segment. As a result "row 4" 59 (i.e., RPORT=4) and "column 4" 58 (i.e., XPORT=4) will contain null XMASK values 55.

Figure 13:
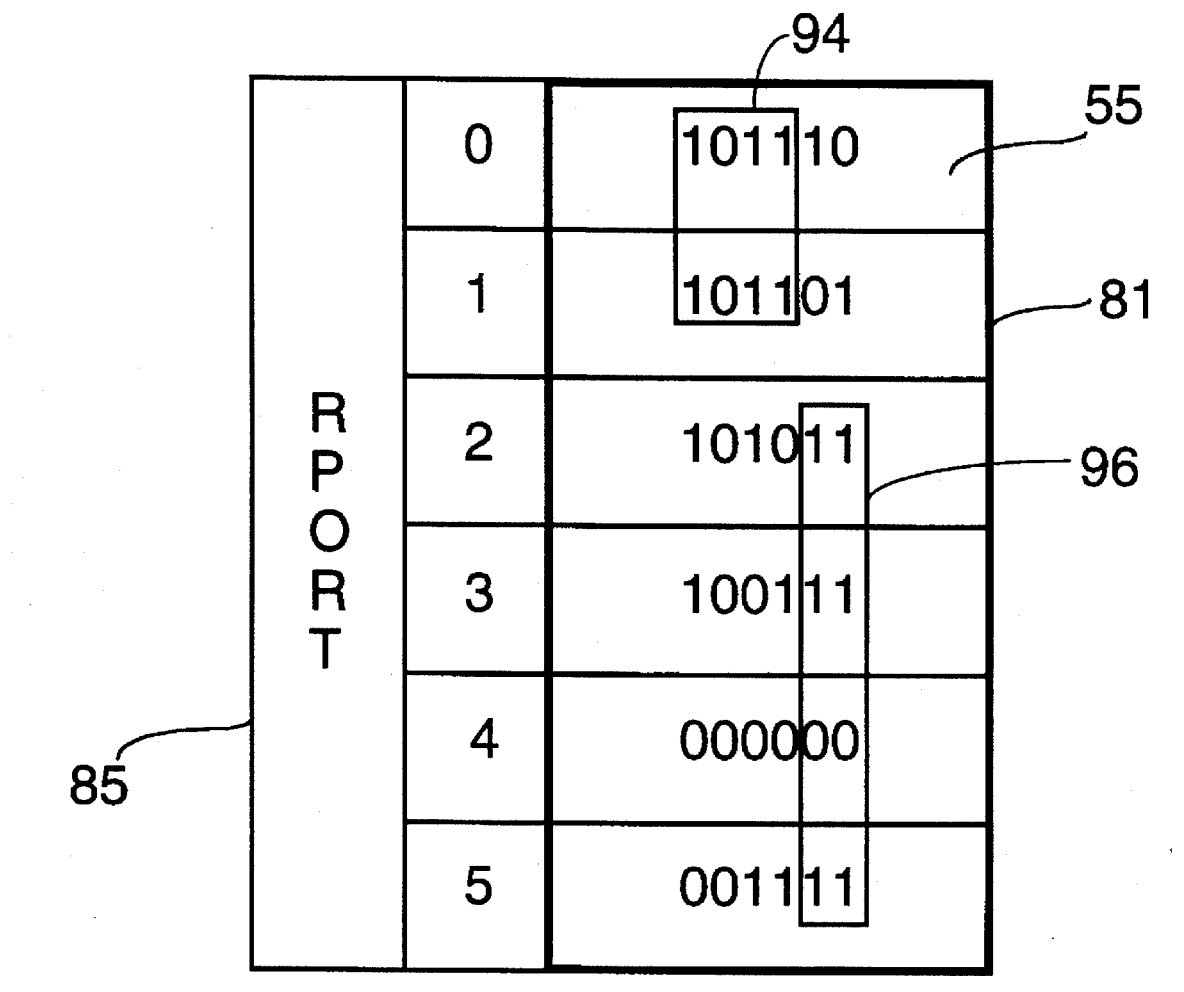

The Broadcast/Multicast Table 81 is illustrated in FIG. 13. When a received packet indicates a Broadcast or Multicast address (that is when the Broadcast/Multicast flag 21 is set), the Broadcast/Multicast Table 81 is used in place of the Forwarding Table 80 to develop XMASK 55. The Broadcast/Multicast Table 81 is a one dimensional array indexed by RPORT 85. Each array entry is an XMASK value 55. FIG. 13 illustrates a Broadcast/Multicast Table 81 in which all ports are allowed to communicate with one another, except for Port 4, the monitoring port of the example. Therefore, each entry will have a 1 in each XMASK 55 bit position except for bit 4 (the monitoring port) and the bit corresponding to RPORT (thereby preventing broadcast to the source port).

Network Groups (NG) affect the contents of the Forwarding Table 80 and the Broadcast/Multicast Table 81. The examples in FIGS. 12 and 13 assume that all ports are allowed to communicate. If a network administrator has restricted communication by defining network groups, then some of the "1" entries in FIGS. 12 and 13 will be set to 0. For example, if ports 0 and 1 were defined as belonging to one network group, and ports 2, 3, 4, 5 were defined as belonging to another, then all of the Forwarding Table entries in the outlined regions 90, 92 in FIG. 12 would be 000000. Similarly, the Broadcast/Multicast Table bits in the outlined regions 94, 96 in FIG. 13 would also be zeros. Subsequent examples do not show Network Groups, but the port-monitoring operations described later take into account the possibility that Network Groups have been defined.

For packets generated within the bridge or router related to network management and router operation, Management Table 82 (FIG. 14) is used. This table is a one dimensional array indexed by MPORT 78, the port number on which the management related packet is to be sent. FIG. 14 illustrates an example Management Table 82 in which each port is available for participation in management functions except for Port 4, the monitoring port 10.

Although the Bridging Table 25 and the Forwarding Table 80 are sufficient for the XMASK 55 calculation, performance of the forwarding process can be improved significantly by the introduction of an additional data structure designated as the Bridging Cache 83 and shown for the preferred embodiment in FIG. 15. Conceptually, the Bridging Cache 83 contains multiple logical entries in which specific RPORT 85, SA 16 and DA 15 values are associated with an XMASK 55. Since this association changes slowly, it is usually possible to bypass the normal forwarding calculation and retrieve the XMASK 55 value directly from the Bridging Cache 83. Other factors, such as NG and RSTATE also change slowly and thus do not degrade the operation of the Bridging Cache 83 unduly.

When an XMASK value is calculated, the RPORT 85, SA 16 and DA 15 value used in the calculation are combined into an entry and placed in the Bridging Cache 83. When a new packet arrives for forwarding, the Bridging Cache 83 is accessed to determine if the RPORT 85, SA 16 and DA 15 associated with the packet match the RPORT 85, SA 16, and DA 15 of a Bridging Cache entry. If a match is found, then the XMASK value 55 from the Bridging Cache 83 can be used. Otherwise, the full forwarding algorithm must be carried out.

In the preferred embodiment, the Bridging Cache is partitioned into separate sub-caches—one associated with each RPORT 85. Since the maximum number of the receiving ports is relatively small, this is a very efficient method of handling part of the cache look-up. The Bridging Cache is accessed with the 3-tuple <RPORT,SA,DA>. Based on RPORT 85, the appropriate sub-cache associated 77 with the receive port is selected. Next the 96-bit value consisting of SA 16 concatenated with DA 15 is hashed using well-known techniques to produce a pointer to a Bridging Cache entry 79 in the selected sub-cache 77. A comparison is then made between the input SA, DA values and the SA, DA values in the selected Bridging Cache entry 79. If a match is obtained, the XMASK value 55 for that entry is retrieved. If no match occurs, the next Bridging Cache entry 79 is examined in like manner. This process continues until a match is found or a maximum number of attempts is made. Other approaches to accessing of the Bridging Cache 83 achieving the same result will be evident to those skilled in the art.

Use of the Bridging Cache 83 replaces the need to validate the received SA 16 in the Bridging Table 25, to look-up XPORT 86 in the Bridging Table 25 and to use the Forwarding Table 80 to retrieve XMASK 55. RPORT 85 and SA 16 are both used in the cache access so that changes to the port association of SA can be detected and accommodated as described next.

Bridging Cache entries 79 must be invalidated or flushed if they no longer reflect the outcome of the Bridging Algorithm. If, for example, the correspondence between SA 16 and RPORT 85 is found to be invalid, all Bridging Cache entries 79 with the corresponding SA 16 value in the RPORT sub-cache 77 must be cleared (the "flush" step in FIG. 16). System level events may also cause a cache flush. For example, any change to the CFRs, the network groups NG, or the spanning-tree state may result in Bridging Cache entries 79 becoming invalid. In these cases, the offending Bridging Cache entries 79 must be removed or, if it is more efficient, all cache entries may be invalidated. Commands issued from the Supervisory Access Terminal 12 (or its network equivalent) may also cause a cache flush.

In some embodiments, any port or address to which a CFR is applied is excluded from the Bridging Cache 83. In other embodiments, Bridging Cache entries 79 include additional fields indicating the presence of a CFR and its point of application (DA, SA, RPORT). In some implementations this may allow CFR-related information to be accessed more quickly, depending on how data structures selected are realized.

It will be further recognized by those skilled in the art that alternatives to the Bridging Cache 83 data structures are possible while still preserving its performance-enhancing properties. Furthermore, it is also possible to associate the data structures discussed above, such as the Bridging Table 25, the Bridging Cache 83, with separate CPUs and memories, even though in the preferred embodiment they are implemented by code and data in the Main CPU 42 and Program Memory 41.

FORWARDING ALGORITHM

Packets that require forwarding may be incoming packets arriving at the bridge from its ports 3 or internally generated management packets. The forwarding algorithm discussed below operates in both cases and is also independent of whether port monitoring is enabled or disabled. To aid in illustrating the approach, a flow chart is provided in FIG. 16.

It is assumed that the forwarding algorithm will be entered with parameters DA 15, SA 16, RPORT 85 from incoming packets and with MPORT 78 for internally generated packets. Execution of the forwarding algorithm in the preferred embodiment is carried out on the Main CPU 42.

Figure 16A:
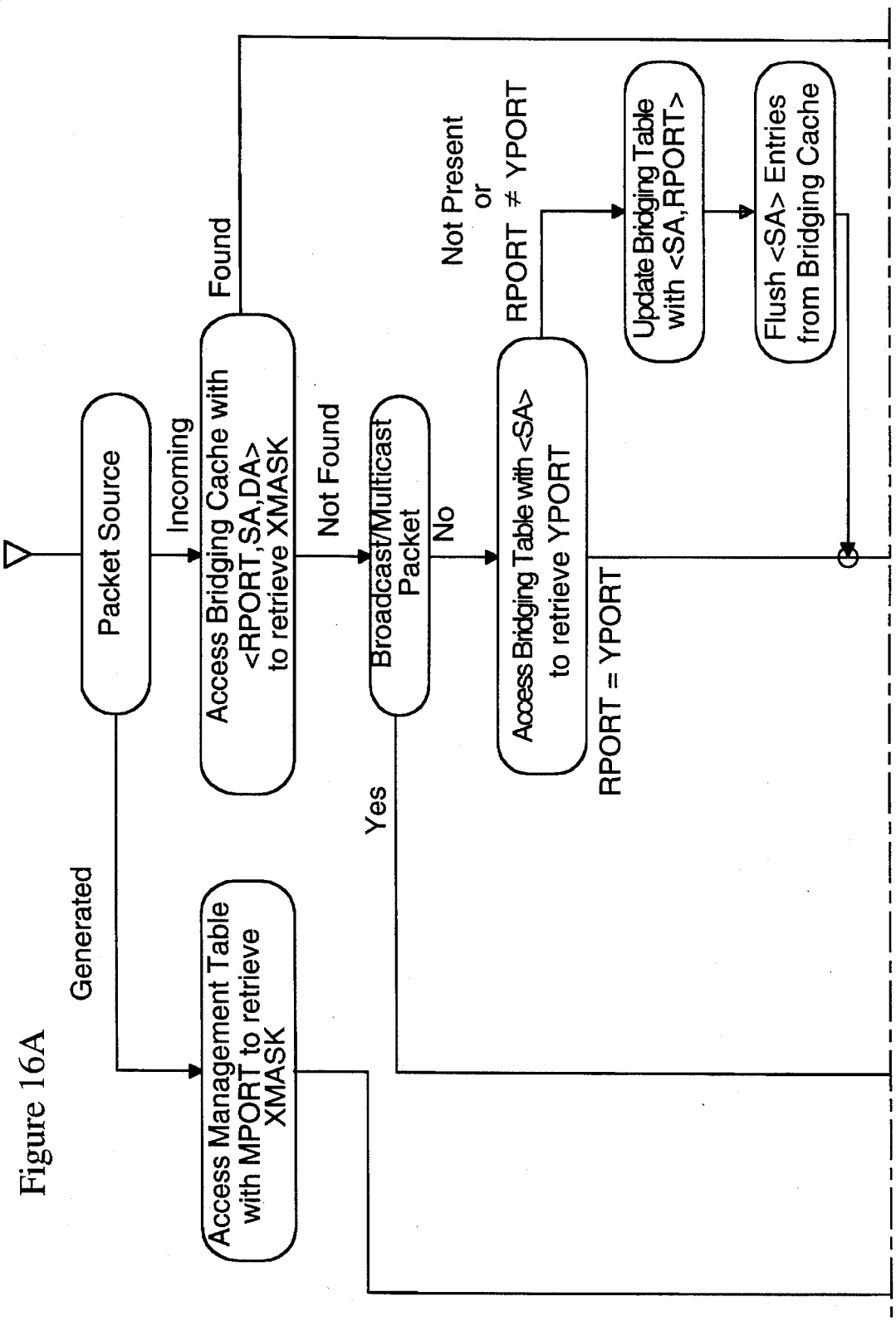
FIG. 16 is a flowchart of the forwarding algorithm.
Figure 16B:
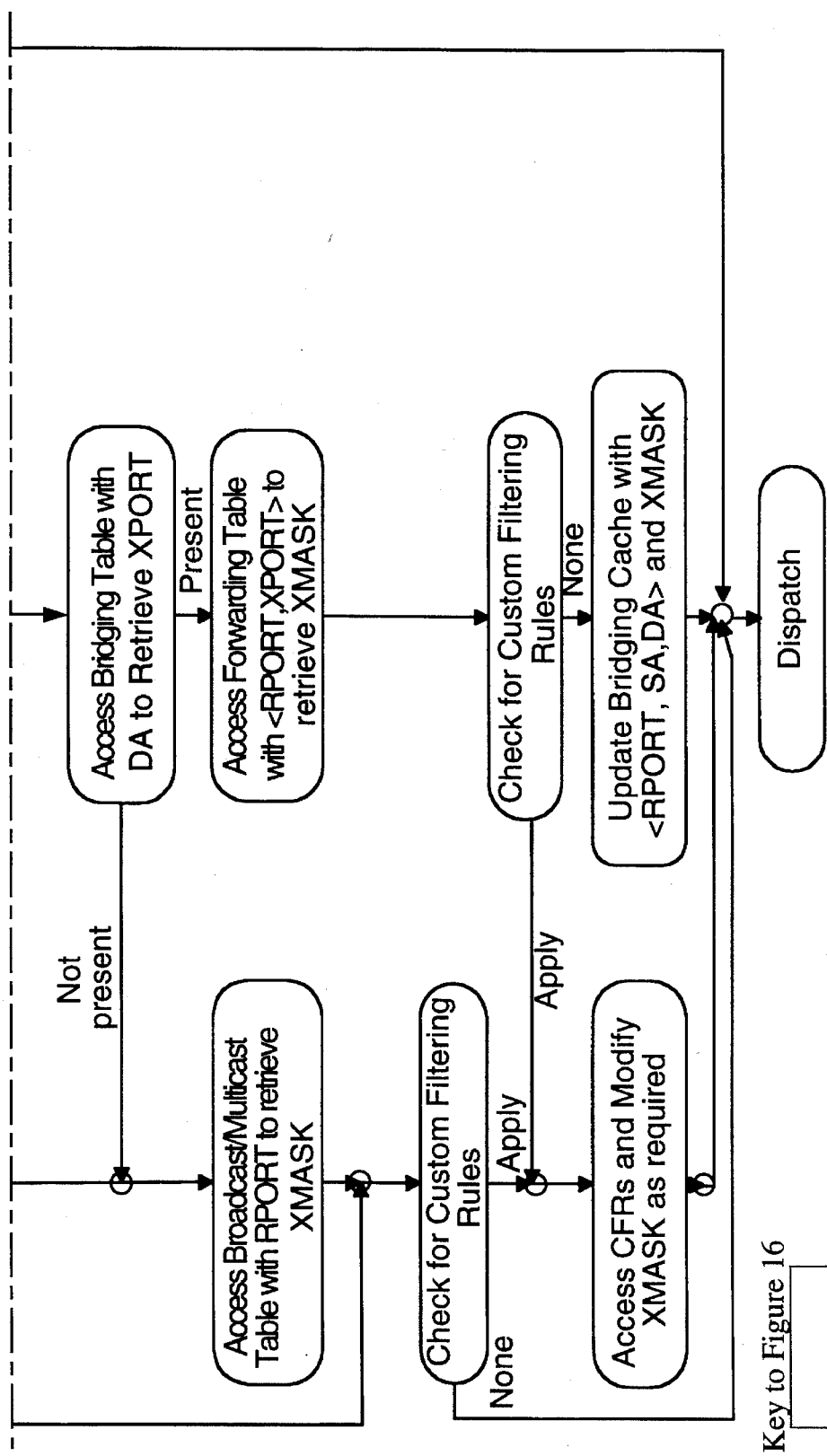

Referring to FIG. 16, it will be seen that first a packet source decision is made. Then, for generated packets originating within the bridge, the XMASK value 55 is simply retrieved from the Management Table 82.

For incoming packets, the SA 16 and DA 15 from the packet and the RPORT 85 value reflecting the port number on which the packet was received, are used to access the Bridging Cache 83. If the 3-tuple <RPORT,SA,DA> is found in the Bridging Cache 83, the XMASK value 55 is retrieved immediately and the bridging algorithm is complete. Alternatively, if the 3-tuple <RPORT,SA,DA> is not found, full processing of the packet addresses must take place. In some embodiments, the Bridging Cache 83 will never contain an XMASK entry 55 for a Broadcast/Multicast addresses or if a custom filter rule is applicable to DA, SA or their associated ports. This restriction avoids wasting space in the bridging cache, since custom filtering rules must make decisions on the packet data as well as the SA 16 and DA 15 and thus cannot have a valid, static XMASK 55 value in the Bridging Cache.

Full packet processing (i.e. when no matching cache entry is found), first involves a test of the DA 15 to determine if the Broadcast/Multicast flag 21 is set. If it is set then the XMASK value 55 is retrieved directly from the Broadcast/Multicast Table 81 using RPORT If the Broadcast/Multicast bit is not set, then the next step is to access the Bridging Table 25 using SA to determine if the source address and its associated RPORT value 85 are currently present and correct. If it is determined that the SA 16, RPORT 85 relationship has changed or SA 16 is not present, then the Bridging Table 25 must be updated to reflect the new relationship. When this occurs, it is also necessary to search the Bridging Cache 83 and invalidate any entries with a Source Address field 16 equal to the SA 16 from the received packet If the Bridging Table 25 access shows that SA 16 is present and has the correct RPORT value, then the Bridging Table 25 is re-accessed using DA 15 in an attempt to retrieve the XPORT value 15 corresponding to DA. In the event that an entry corresponding to DA 15 is not found, the RPORT value will be used to access the Broadcast/Multicast Table 81 to retrieve an XMASK This XMASK will indicate ports to which the packet will be directed in an attempt to place it on a network where DA is located.

When DA 15 is present in the Bridging Table 25, the XPORT value 86 will be retrieved indicating the port where DA 15 is located. Using RPORT 85 and XPORT 86, the Forwarding Table 80 is accessed and an XMASK 55 is retrieved.

After completion of the processing detailed here, an XMASK value 55 is available for use in dispatching. In cases where XMASK 55 is obtained from the Bridging Cache 83, dispatching may be done directly. In all other cases, it is necessary to check for the presence of custom filtering rules. Flags indicating the presence of custom filtering rules are maintained in the Bridge Table 25 for SA 16 and DA 15 and in separate rule tables associated with each port. When indicated, the appropriate CFRs are evaluated and the XMASK 55 is modified as required to produce a final value. This process can be quite involved and may affect performance significantly. When the processed packet is incoming (not generated) with a single station DA (not Broadcast or Multicast) and no CFRs are to be applied, the Bridging Cache 83 is updated from <RPORT,SA,DA> to reflect the new XMASK value 55.

In the preferred embodiment, packets with Multicast/Broadcast addresses are not placed in the Bridging Cache 83. There is nothing to prevent this from being done; however such packets are a relatively small part of the total packet traffic. Therefore, the Bridging Cache 83 is better used if entries are devoted exclusively to single address DAs 15. In situations with different traffic profiles from the preferred embodiment, it may be desirable to include multicast and broadcast addresses in the Bridging Cache 83.

DESCRIPTION OF PORT MONITORING FEATURE

Port monitoring is a process by which packets arriving at the bridge or generated internally may be copied to one or more monitoring ports 10 (FIG. 1). A monitoring device 9 attached to the monitoring port 10 is then able to provide analysis of the monitored packets. In the preferred embodiment, the monitoring device 9 would be, for example, a Sniffer™ from Network General or a LANalyzer™ from Novell. These devices analyze packet traffic on a network and provide various diagnostic information enabling the network manager to locate problems, evaluate performance, and determine appropriate adjustments to network parameters.

Port monitoring is controlled from the supervisory access terminal 12. Using this terminal, the network manager may identify monitored ports 3 and monitoring ports 10. When port monitoring is enabled, packets associated with the monitored ports 3 will be forwarded to monitoring ports 10. In the preferred implementation, these packets are not actually copied, but the packet processing protocol described above is used in which only the Packet Descriptors 49 are copied.

Port monitoring is controlled by the Supervisory Access Terminal 12 using a simple command-line language. Table II illustrates the syntax of the commands. For each command, the prefix "pm" indicates that this is a port-monitoring command. There are three basic commands: "view", "viewpair" and "close". The first three commands shown in Table II are of the "view" type as identified by the command word "view". These commands designate a <monitored-port-number> and <monitoring-port-number>. There is also a field to designate the type of monitoring desired, either "incoming", "forwarded" or "generated". Incoming packets are those arriving at a designated monitored port 3. Forwarded packets are all packets forwarded to the designated monitored port 3 from any other port. Generated packets are those generated internally by the bridge and forwarded to the monitored port 3. When the view command is given, all packets of the designated type will be "copied" from the port designated by <monitored-port-number> to the port designated by <monitoring-port-number>, in addition to their normal dispatching.

A "viewpair" command specifies a pair of ports 3 and a monitoring port 10. Packets received on the port designated by the <source-monitored-port-number> and forwarded to the port designated by <destination-monitored-port-number> will be "copied" to the port designated by <monitoring-port-number>.

To terminate port monitoring, the "close" command is issued.

It is intended that the effect of individual commands be cumulative, that is, each processed command (except "close") will enable additional port monitoring. The effects of any commands issued since the previous "close" command will continue unchanged. Thus, through repeated application of the commands above, several ports may be designated as monitored ports, several ports may be designated as monitoring ports or various combinations thereof.

For illustrative purposes, a simple command language has been specified. It will be recognized that the command syntax outlined above could be enhanced using well-known techniques to provide a compound type of command allowing several monitored ports, monitoring ports, and packet forwarding situations to be specified in one command line or through other types of user interfaces.

TABLE II

Port Monitoring Command Syntax pm view incoming <monitored-port number> on <monitoring-port number>
pm view forwarded <monitored-port number> on <monitoring-port number>
pm view generated <monitored-port number> on <monitoring-port number>
pm viewpair <source-monitored-port-number>, <destination-monitored-port-number> on <monitoring-port-number>
pm close

IMPLEMENTATION OF PORT-MONITORING COMMANDS

Up to this point, the bridge 1, its implementation and operation, has been illustrated only for normal operation, where port monitoring is disabled. Based on commands issued from the supervisory access terminal 12, numerous aspects of port monitoring may be enabled. For the preferred implementation, port monitoring involves modifying the data structures discussed previously to indicate the monitored 3 and monitoring ports 10. Modification will be illustrated for each of the monitoring situations: forwarded, incoming, generated, and port pairs.

To illustrate the effects of various port monitoring commands on the forwarding data structures, examples will be provided based on the use of Port 4 as the designated monitoring port 10. For single-port monitoring, port 2 will be used, and for port-pair monitoring, port 2 will be the source-monitored-port and port 3 will be the destination monitored port.

For all the examples, the assumption has been made that the monitoring port, Port 4 is used only for monitoring. Therefore, packets will only be forwarded to Port 4 due to the enabling of the port-monitor function. This is the preferred mode of operation for the bridge when port monitoring is enabled, since other stations on the monitoring port may be unable to properly interpret packet traffic arising from the port-monitoring function.

Monitoring of Incoming Packets

If incoming packets on a port are to be monitored, then all packets received at the designated monitored port must be copied to the monitoring port. Packets are copied to the monitoring port even if they are not to be sent to any other port (i.e. they are consumed by the bridge). When monitoring of incoming packets is required, the Forwarding Table 80 and the Broadcast/Multicast Table 81 are modified. The Management Table 82 is not modified, since it affects only generated packets.

To enable monitoring of incoming packets on <monitored-port-number>, each entry in the Forwarding Table 80 where RPORT 85 is equal to <monitored-port-number> is modified. For each such entry, the XMASK bit corresponding to <monitoring-port-number> is set. FIG. 17A shows the results of executing the command "pm view 2 on 4" on the example Forwarding Table of FIG. 12. Since port 2 is to be monitored on Port 4, each XMASK entry 55 in "row 2" 60 will have bit 4 set.

A similar modification must be made to the Broadcast/Multicast Table 81. For the XMASK entry 55 where RPORT 85 is equal to <monitored-port-number> the XMASK bit corresponding to <monitoring-port-number> is set. FIG. 17B illustrates the results of executing "pm view 2 on 4" on the example Broadcast/Multi-task table 81 of FIG. 13. Due to command execution, the entry 61 for RPORT=2 has bit 4 corresponding to the monitoring port set. For the other entries, bit 4 is unchanged and remains cleared since Port 4 is isolated to support port monitoring in the preferred manner.

No modifications are made to the Management Table 82 to support the monitoring of incoming packets since XMASK values 55 in the table apply only to packets generated by the bridge.

Monitoring of Forwarded Packets

In the case where forwarded packets are to be monitored, it is necessary to modify XMASK entries 55 in the Forwarding Table 80 and Broadcast/Multicast Table 81 so that each packet forwarded to a designated <monitored-port-number> is also "copied" to the <monitoring-port-number>. No changes are made to the Management Table 82.

To accommodate monitoring of packets forwarded to <monitored-port-number>, the bit corresponding to <monitoring-port-number> must be set in the XMASK of each entry in the Forwarding Table 80 where XPORT is equal to <monitored port number> except for the entry where RPORT is equal to <monitored-port-number>. FIG. 18A shows the result of executing the command "pm view forwarded 2 on 4" on the example Forwarding Table 80 of FIG. 12. The modified entries are the "column 2" 73 and indicate that packets forwarded to port 2 should also be forwarded to Port 4, the monitoring port. The entry where RPORT=XPORT=2 has a null XMASK (000000) since packets received on port 2 should not be forwarded to that port.

Broadcast/Multicast packets can also be forwarded to the monitored port 3, thus it is necessary to modify the Broadcast/Multicast Table 81. Each XMASK entry in the Broadcast/Multicast Table 81 is modified by ORing the bit corresponding to <monitored-port-number> with the bit corresponding to <monitoring-port-number> and placing the result in the bit corresponding to <monitoring-port-number>. FIG. 18B shows the results of modifying the Broadcast/Multicast Table of FIG. 13 according to the command above. The result is that "bit column" 2 62 is ORed with "bit column" 4 63, and the result is returned to bit column 4 63 indicating that each Broadcast/Multicast packet from an RPORT that is forwarded to port 2 should also be forwarded to Port 4.

Monitoring of Generated Packets

Monitoring of generated packets involves modifying only the Management Table 82. The Forwarding Table 80 and the Broadcast/Multicast Table 81 remain unchanged since they have no effect on the forwarding of generated packets originating within the bridge itself.

To enable monitoring of generated packets, each XMASK entry 55 in the Management Table 82 is modified so that the bit corresponding to <monitored-port-number> is ORed with the bit corresponding to <monitoring-port-number>, and the result is placed in the bit corresponding to <monitoring-port-number>.

Figure 19:
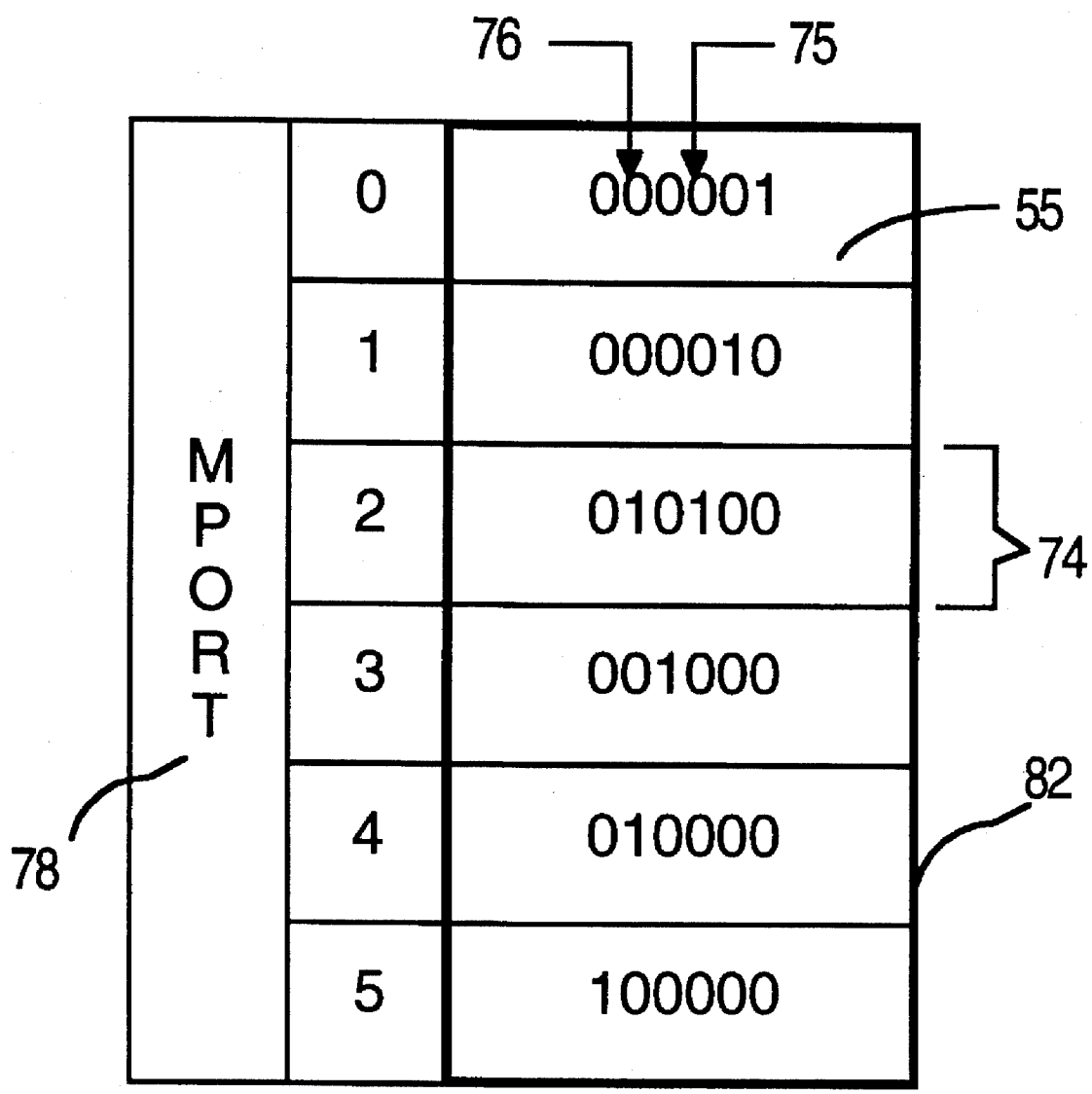
FIG. 19 illustrates the Management Table after modification to support monitoring of generated packets.

FIG. 19 illustrates the result of the command "pm view generated 2 on 4" as applied to the example Management Table of FIG. 14. "Bit column" 2 75 corresponding to the monitored port 2 has been ORed with "bit column" 4 76 representing the monitoring Port 4, and the result is returned to bit column 76.

Monitoring of Port Pairs

When port-pair monitoring is enabled, packets originating on a source monitored port 3 and forwarded to a destination monitored port 3 will be copied also to the monitoring port 10. To support this option, the Forwarding Table 80 and Broadcast/Multicast table 81 must be modified but the Management Table 82 is unchanged.

The XMASK entry 55 in the Forwarding Table 80 designated by RPORT=<source-monitored-port number> and XPORT=<destination-monitored-port-number> is modified by setting the XMASK bit corresponding to <monitoring-port-number>. FIG. 20A shows the results of applying the command "pm view pair 2 3 on 4" to the example Forwarding Table 80 of FIG. 12. The modified entry 84 is highlighted.

In the Broadcast/Multicast Table 81, the entry corresponding to RPORT=<source-monitored-port number> is modified by ORing the XMASK bit corresponding to <destination-monitored-port-number> with the bit corresponding to <monitoring-port-number> and placing the result in the bit corresponding to <monitoring-port-number>. FIG. 20B shows the result of applying the above command to the example Broadcast/Multicast Table of FIG. 13. Only the RPORT=2 entry 61 corresponding to the source monitored port is modified by ORing XMASK bit 3 (corresponding to <destination-monitored-port-number>) with bit 4 (corresponding to <monitoring-port-number>) and placing the result in bit 4. No change to the Management Table 82 is required to enable monitoring of a port pair.

Close Command

The effects of port monitoring are cumulative. When a "pm close" command occurs, the Forwarding Table Broadcast/Multicast Table 83 and Management Table 82 are simply restored to their original state before the application of any "pm view" or "pm viewpair" command.

Other Issues Related to Port Monitoring

Port Monitoring works naturally with the Bridging Cache 83. XMASK values obtained from the Forwarding Table 80 are placed in the Bridging Cache 83 provided no CFRs are in effect as would be the case in normal processing. Operation of the Bridging Cache 83 is unaffected by port monitoring.

CFRs may be applied to the monitoring port 10. However, in the preferred embodiment this was not allowed so as to improve efficiency.

Because the application of monitoring commands may change XMASK values 55, it is important to flush the Bridging Cache 83 whenever a monitoring command is given.

In some embodiments, packets with errors and those that are too large or too small are not "copied" to monitoring port 10. This could be done if it was desirable in a particular implementation.

The uncertainty as to the monitored packet's originating network segment is reduced. Indeed, the bridge knows precisely on which port each incoming packet was received, even if the packet's SA is wrong due to malfunction or sabotage. Thus the packets received on precisely selected port or ports can be isolated and forwarded to the network monitor even if the packets have wrong source addresses. The bridge debugging is therefore facilitated. In particular, security problems become easier to solve. The uncertainty is reduced also in the router embodiments because the router also determines the packet's receiving port independently of the packet's SA.

In some embodiments, different network segments connected to the bridge use different protocols. The bridge translates packets from one protocol format to another as needed. In particular, each packet transmitted to the monitoring port 10 is translated, if needed, to the format of the segment attached to the monitoring port. The bridge's ability to translate packets allows freedom in selecting the network segment attached to the monitoring port. For example, in some embodiments, some non-monitoring port segments are FDDI segments, and the segment attached to the monitoring port is an Ethernet segment. Using the Ethernet segment allows reducing the network cost because Ethernet network monitors are typically less expensive than FDDI network monitors.

PORT MONITORING IN ROUTERS

In router implementations, many of the basic issues related to port monitoring are also present. Packets are routed based on the contents of the Data Field 17. Routing depends on data structures similar to those used in bridging. For instance, there may be a Routing Table for translating network addresses into ports and network destinations. There may also be Address Resolution Tables to translate router and host targets into actual Ethernet addresses, which are in turn used to update the DA 15 of the packet 13 to direct it to the next link or to the final destination. As in bridging, performance can be improved by caching recently calculated results. For example, the Network address, Ethernet address and port number may be cached together with an XMASK 55 value. Because the forwarding decision depends on many factors, such as router state, state of the next hop, and the state of the route it is not possible to compute the XMASK 55 in a static, direct manner as can be done for bridging. When monitoring is enabled, the XMASK 55 derived from the Routing Table and Address Resolution Table is modified algorithmically according to the monitoring currently enabled. This XMASK 55 is then cached for later reference in the Routing Cache.

When forwarding an incoming packet, a router normally modifies a portion of the packet header. For example, it replaces the SA and DA of the received packet with its own SA and the DA of the next hop, and it may update a hop count. When port monitoring is in effect, the packet forwarded on the monitoring port is the modified packet, not exactly the received packet.

In some embodiments, in order to forward exactly the received packet to the monitoring port, the router makes a copy of the received packet before modifying it. It will be apparent to those skilled in the art that it may not be necessary to copy the entire packet, only the modified part, if the Port Controllers 37 can "gather" multiple buffers into a single packet for transmission. In this case, an extra buffer can be allocated for the copied and modified part of the packet, while the original buffer can be used to forward the packet to the monitoring port (or vice versa).

While the invention has been described in terms of a preferred implementation based on a specific bridge and network example, those skilled in the art will recognize that the invention can be practiced with modification and extension within the spirit and scope of the appended claims.

We claim:

1. An inter-network communication apparatus comprising:

a plurality of ports P for connecting the apparatus to a plurality of network segments;

a port MP for connecting the apparatus to a network monitor; and means M1 for transmitting packets of information to one or more of the ports P wherein each packet of information includes information I1 for determining one or more ports P to which the packet of information is to be transmitted, wherein the means M1 can transmit a packet of information: (1) to one or more of the ports P determined based on the information I1 in the packet and, in addition, (2) to port MP, wherein:

the means M1 comprises a store for storing one or more entries each of which comprises a triple (SA, DA, XP) wherein:

SA is a source address;

DA is a destination address; and

XP identifies zero, one, or more than one of ports P and MP to which a packet having a source address SA and a destination address DA is to be transmitted; and said apparatus further comprises means M for searching, when a packet of information is received, said store for an entry whose SA and DA correspond, respectively, to a source address and a destination address of the received packet, wherein, if such an entry is found, the means M determines destination ports for the received information from XP of the found entry.

2. The apparatus of claim 1 further comprising said network segments and said network monitor.

3. The apparatus of claim 1 wherein:

each entry comprises a quadruple of the form (RPORT, SA, DA, XP) wherein:

RPORT identifies one of ports P;

(SA, DA, XP) is one of said triples, and XP identifies zero, one, or more than one of ports P and MP to which information which is received on port RPORT and which has a source address SA and a destination address DA is to be transmitted; and said means M is for searching said store, when a packet is received, for an entry whose RPORT identifies the port on which the packet is received and whose SA and DA correspond, respectively, to a source address and a destination address of the received packet, wherein, if such an entry is found, the means M determines destination ports for the received information from XP of the found entry.

4. The apparatus of claim 3 wherein, for each entry, XP is a map in which, for each port P1, one or more bits specify whether information is to be transmitted to said port P1.

5. An apparatus for allowing a plurality of units to communicate with each other, said apparatus comprising:

one or more ports P for connection to said plurality of units;

a port MP for connecting a monitoring system to said apparatus; and means for transmitting packets of information to said ports P and MP such that each packet of information includes information I1 for determining one or more ports to which the packet is to be transmitted, wherein said transmitting means can select a subset of packets of information and can transmit each packet of the selected subset to one or more ports determined based on the information I1 in the packet, and wherein said transmitting means can transmit each packet of the selected subset to said port MP whether or not the port MP is a port determined based on the information I1 in the packet, and wherein said transmitting means comprises means for applying one or more custom filtering rules to determine which information is to be transmitted to port MP.

6. The apparatus of claim 5 wherein each unit comprises a network segment.

7. The apparatus of claim 5 wherein said transmitting means can transmit to port MP information incoming on one or more selected ports P without transmitting to port MP all incoming and outgoing information on said selected ports.

8. The apparatus of claim 5 wherein said transmitting means can transmit to port MP information forwarded to one or more selected ports P without transmitting to port MP all incoming and outgoing information on said selected ports.

9. The apparatus of claim 5 wherein said transmitting means can transmit to port MP information generated by said apparatus for transmission to one or more selected ports P without transmitting to port MP all incoming and outgoing information on said selected ports.

10. The apparatus of claim 5 wherein said transmitting means can transmit to port MP information forwarded from a selected port P1 of ports P to a selected port P2 of ports P without transmitting to port MP all incoming and outgoing information on ports P1 and P2.

11. The apparatus of claim 5 wherein said transmitting means comprises a store for storing for each pair (RPORT, XPORT) of ports P information identifying all those ports P and MP to which the apparatus is to transmit information having a source address corresponding to port RPORT and a destination address corresponding to port XPORT.

12. The apparatus of claim 5 wherein said transmitting means comprises a store for storing for each port RPORT of ports P information identifying all those ports P and MP to which the apparatus is to transmit information having a source address corresponding to port RPORT and a destination address specifying a broadcast or multicast transmission.

13. An apparatus comprising:

a plurality of ports for connecting to said apparatus a plurality of network segments and one or more network monitors, wherein one or more of said plurality of ports can be designated as monitoring ports to be used for connecting to said apparatus one or more network monitors; and means for transferring packets of information among said ports according to a forwarding algorithm and for selecting one or more packets of information and transmitting according to said forwarding algorithm the selected packets of information to one or more of said monitoring ports, wherein each packet of information includes information I1 for determining one or more ports to which the packet of information is to be transmitted and said means is responsive to a command to transmit the selected packets to one or more of said monitoring ports whether or not the information I1 in any selected packet determines any monitoring port as a port to which the selected packet is to be transmitted, said means comprising:
a store for specifying whether information incoming on a non-monitoring port is to be transmitted to one or more of said monitoring ports; and
means for transmitting information in accordance with contents of said store.

14. The apparatus of claim 13 wherein said apparatus is a bridge.

15. An apparatus comprising:
a plurality of ports for connecting to said apparatus a plurality of network segments and one or more network monitors, wherein one or more of said plurality of ports can be designated as monitoring ports to be used for connecting to said apparatus one or more network monitors; and
means for transferring packets of information among said ports according to a forwarding algorithm and for selecting one or more packets of information and transmitting according to said forwarding algorithm the selected packets of information to one or more of said monitoring ports, wherein each packet of information includes information I1 for determining one or more ports to which the packet of information is to be transmitted and said means is responsive to a command to transmit the selected packets to one or more of said monitoring ports whether or not the information I1 in any selected packet determines any monitoring port as a port to which the selected packet is to be transmitted, said means comprising;
a store for specifying whether information forwarded to a non-monitoring port is to be transmitted to one or more of said monitoring ports; and
means for transmitting information in accordance with contents of said store.

16. The apparatus of claim 13 wherein said means comprises:
a store for specifying whether information generated by said apparatus and transmitted to a non-monitoring port is also to be transmitted to one or more of said monitoring ports; and
means for transmitting information in accordance with contents of said store.

17. An apparatus comprising:
a plurality of ports for connecting to said apparatus a plurality of network segments and one or more network monitors, wherein one or more of said plurality of ports can be designated as monitoring ports to be used for connecting to said apparatus one or more network monitors; and
means for transferring packets of information among said ports according to a forwarding algorithm and for selecting one or more packets of information and transmitting according to said forwarding algorithm the selected packets of information to one or more of said monitoring ports, wherein each packet of information includes information I1 for determining one or more ports to which the packet of information is to be transmitted and said means is responsive to a command to transmit the selected packets to one or more of said monitoring ports whether or not the information I1 in any selected packet determines any monitoring port as a port to which the selected packet is to be transmitted, said means comprising:
a store for specifying whether information forwarded from one selected non-monitoring port to another selected non-monitoring port is to be transmitted to one or more of said monitoring ports; and
means for transmitting information in accordance with contents of said store.

18. A method for monitoring one or more ports PP1 of a communication apparatus interconnecting a plurality of network segments, said method comprising the steps of:
connecting to one or more ports MP of said ports one or more monitoring systems; and
selecting packets of information, each packet including information I1 for determining one or more of the ports PP1 to which the packet is to be transmitted, and transmitting by the apparatus selected packets of information to one or more ports MP whether or not the information I1 in any selected packet determines any port MP as a port to which the selected packet is to be transmitted,
said method further comprising the steps of:
storing packets of information in buffers; and
providing for each port P2 of said ports a data structure for containing one or more pointers to one or more buffers that store packets to be transmitted on the port P2,
wherein the step of selecting packets of information and transmitting the selected packets comprises the step of transmitting on each port P2 packets stored in buffers pointed to by pointers in the data structure of the port P2.

19. The method of claim 18 wherein the selected packets of information comprise information received on a selected port connected to a network segment.

20. The method of claim 18 wherein the selected packets of information comprise information forwarded to a selected port connected to a network segment.

21. The method of claim 18 wherein the selected packets of information comprise information generated by the apparatus and transmitted to a selected port connected to a network segment.

22. The method of claim 18 wherein the selected packets of information comprise information forwarded from one selected port connected to a network segment to another selected port connected to a network segment.

23. The apparatus of claim 1 wherein the information I1 comprises a destination address.

24. The apparatus of claim 1 wherein the means M1 comprises:
a store for storing: (1) buffers for storing packets of information, (2) for each port P1 of ports P, a first data structure for containing one or more pointers to one or more buffers that store packets received on the port P1, and (3) for each port P2 of the ports P and MP, a second data structure for containing one or more pointers to one or more buffers that store packets to be transmitted on the port P2;
means M2 for transmitting on each port packets stored in buffers pointed to by pointers contained in the second data structure of the port; and means for copying at least one pointer from the first data structure of a first port to the second data structures of one or more second ports to forward a packet received on the first port to the one or more second ports.

25. The apparatus of claim 1 wherein the packets have a variable number of data units.

26. The apparatus of claim 5 wherein said transmitting means comprises a store for storing for each port MPORT of ports P information identifying all those ports P and MP to which the apparatus is to transmit packets generated by said apparatus and having the information I1 corresponding to port MPORT.

27. The apparatus of claim 26 wherein the information I1 comprises a destination address.

28. The apparatus of claim 5 wherein the packets have a variable number of data units.

29. The apparatus of claim 13 wherein the packets have a variable number of data units.

30. The method of claim 18 further comprising the step of receiving a packet PC1 of information on one of said ports wherein the step of selecting packets and transmitting selected packets further comprises the steps of:

determining one or more ports to which the packet PC1 is to be transmitted; and inserting a pointer to a buffer storing at least a portion of the packet PC1 into the data structure of each port on which the packet PC1 is to be transmitted.

31. The method of claim 18 wherein the packets have a variable number of data units.

32. The apparatus of claim 15 wherein the packets have a variable number of data units.

33. The apparatus of claim 17 wherein the packets have a variable number of data units.

* * * * *

UNITED STATES PATENT AND TRADEMARK OFFICE
CERTIFICATE OF CORRECTION

PATENT NO. : 5,515,376
DATED : May 7, 1996
INVENTOR(S) : Manohar Murthy, John F. Wakerly and Arthur I. Laursen It is certified that error appears in the above-indentified patent and that said Letters Patent is hereby corrected as shown below:

Col. 6, line 29
    Delete "ridge" and insert --Bridge--;

Col. 9, line 34
    Delete "routers" and insert --brouters--;

Col. 21, line 15
    After "column" and before "76" insert --4--.

Signed and Sealed this

Fourteenth Day of January, 1997

Attest:

BRUCE LEHMAN

Attesting Officer     Commissioner of Patents and Trademarks